United States Patent
Ricci

(10) Patent No.: US 9,240,018 B2
(45) Date of Patent: Jan. 19, 2016

(54) METHOD AND SYSTEM FOR MAINTAINING AND REPORTING VEHICLE OCCUPANT INFORMATION

(71) Applicant: Flextronics AP, LLC, Milpitas, CA (US)

(72) Inventor: Christopher P. Ricci, Saratoga, CA (US)

(73) Assignee: AutoConnect Holdings LLC, Wellesley, MA (US)

( * ) Notice: Subject to any disclaimer, the term of this patent is extended or adjusted under 35 U.S.C. 154(b) by 265 days.

(21) Appl. No.: 13/679,443

(22) Filed: Nov. 16, 2012

(65) Prior Publication Data

US 2013/0141247 A1   Jun. 6, 2013

Related U.S. Application Data

(60) Provisional application No. 61/560,509, filed on Nov. 16, 2011, provisional application No. 61/637,164, filed on Apr. 23, 2012, provisional application No. 61/646,747, filed on May 14, 2012, provisional application No. 61/653,275, filed on May 30, 2012, provisional application No. 61/653,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.
*G08C 19/16* (2006.01)
*G06Q 30/02* (2012.01)
(Continued)

(52) U.S. Cl.
CPC ............ *G06Q 30/0265* (2013.01); *B60K 35/00* (2013.01); *B60K 37/02* (2013.01); *B60R 7/04* (2013.01); *B60R 16/037* (2013.01); *B60W 30/182* (2013.01); *G01C 21/20* (2013.01); *G06F 3/017* (2013.01); *G06F 3/0484* (2013.01); *G06F 3/0488* (2013.01); *G06F 9/54* (2013.01); *G06F 13/14* (2013.01); *G06F 13/364* (2013.01); *G06F 17/00* (2013.01); *G06F 17/30386* (2013.01); *G06F 21/10* (2013.01); *G06N 5/02* (2013.01); *G06Q 40/08* (2013.01); *G08C 19/00* (2013.01); *G08G 1/017* (2013.01); *G08G 1/096791* (2013.01);
(Continued)

(58) Field of Classification Search
CPC ....................................................... G08C 19/00
USPC ........................... 340/870.01, 438, 5.8, 425.5
See application file for complete search history.

(56) References Cited

U.S. PATENT DOCUMENTS 4,350,970 A   9/1982   Von Tomkewitsch
5,045,016 A   9/1991   Stern et al.
(Continued)

FOREIGN PATENT DOCUMENTS

WO   WO 2011/147893   12/2011

OTHER PUBLICATIONS

Purcher "Apple Invents In-Vehicle Holistic ID for "iOS in the Car"," Patently Apple, Dec. 2013, 8 pages [retrieved on Dec. 12, 2013 from: www.patentlyapple.com/patently-apple/2013/12/apple-invents-in-vehicle-holistic-id-for-ios-in-the-car.html].
(Continued)

*Primary Examiner* — Eric Blount
(74) *Attorney, Agent, or Firm* — Sheridan Ross P.C.

(57) ABSTRACT

The present disclosure describes an occupant information module that reports, to a third party, occupant information regarding a vehicle occupant.

26 Claims, 14 Drawing Sheets

(51) Int. Cl.

| | | |
|---|---|---|
| G06F 9/54 | (2006.01) | |
| B60R 7/04 | (2006.01) | |
| G08C 19/00 | (2006.01) | |
| G06N 5/02 | (2006.01) | |
| H04L 29/08 | (2006.01) | |
| G08G 1/14 | (2006.01) | |
| H04W 84/00 | (2009.01) | |
| H04W 4/00 | (2009.01) | |
| H04W 4/04 | (2009.01) | |
| G06Q 40/08 | (2012.01) | |
| G06F 17/00 | (2006.01) | |
| G06F 17/30 | (2006.01) | |
| G06F 3/0484 | (2013.01) | |
| G08G 1/16 | (2006.01) | |
| G06F 13/364 | (2006.01) | |
| H04N 21/482 | (2011.01) | |
| G06F 21/10 | (2013.01) | |
| G08G 1/0967 | (2006.01) | |
| G06F 13/14 | (2006.01) | |
| B60R 16/037 | (2006.01) | |
| B60W 30/182 | (2012.01) | |
| G01C 21/20 | (2006.01) | |
| B60K 35/00 | (2006.01) | |
| B60K 37/02 | (2006.01) | |
| G06F 3/01 | (2006.01) | |
| G06F 3/0488 | (2013.01) | |
| G08G 1/017 | (2006.01) | |
| B60W 40/08 | (2012.01) | |
| B60W 50/00 | (2006.01) | |

(52) U.S. Cl.
CPC ............... *G08G 1/143* (2013.01); *G08G 1/16* (2013.01); *H04L 67/02* (2013.01); *H04N 21/482* (2013.01); *H04W 4/001* (2013.01); *H04W 4/046* (2013.01); *H04W 84/005* (2013.01); *B60W 2040/0872* (2013.01); *B60W 2050/0095* (2013.01); *B60W 2540/22* (2013.01); *B60W 2540/26* (2013.01); *B60W 2540/28* (2013.01)

(56) References Cited

U.S. PATENT DOCUMENTS

| | | | |
|---|---|---|---|
| 5,371,802 | A | 12/1994 | McDonald et al. |
| 5,553,661 | A | 9/1996 | Beyerlein et al. |
| 5,619,179 | A | 4/1997 | Smith |
| 5,691,893 | A | 11/1997 | Stothers |
| 6,278,919 | B1 | 8/2001 | Hwang et al. |
| 6,289,332 | B2 | 9/2001 | Menig et al. |
| 6,310,542 | B1* | 10/2001 | Gehlot .................. 340/426.25 |
| 6,388,579 | B1* | 5/2002 | Adcox et al. ............... 340/902 |
| 6,454,178 | B1 | 9/2002 | Fusco et al. |
| 6,487,500 | B2 | 11/2002 | Lemelson et al. |
| 6,666,219 | B2 | 12/2003 | Raches |
| 6,668,219 | B2 | 12/2003 | Hwang et al. |
| 6,718,263 | B1 | 4/2004 | Glass et al. |
| 6,950,013 | B2* | 9/2005 | Scaman et al. ............. 340/436 |
| 7,089,099 | B2 | 8/2006 | Shostak et al. |
| 7,127,348 | B2 | 10/2006 | Smitherman et al. |
| 7,140,338 | B2 | 11/2006 | Janisch |
| 7,231,285 | B2 | 6/2007 | Noguchi |
| 7,418,346 | B2 | 8/2008 | Breed et al. |
| 7,492,283 | B1 | 2/2009 | Racunas, Jr. |
| 7,629,899 | B2 | 12/2009 | Breed |
| 7,663,502 | B2 | 2/2010 | Breed |
| 7,738,462 | B2 | 6/2010 | Hwang |
| 8,068,016 | B2 | 11/2011 | Toh |
| 8,138,950 | B1 | 3/2012 | Leung |
| 8,140,358 | B1 | 3/2012 | Ling et al. |
| 8,187,182 | B2 | 5/2012 | Kahn et al. |
| 8,311,858 | B2* | 11/2012 | Everett et al. ................ 340/438 |
| 8,671,002 | B2 | 3/2014 | Stefik et al. |
| 8,676,449 | B2* | 3/2014 | de Jonk et al. ................. 701/49 |
| 2002/0008639 | A1 | 1/2002 | Dee |
| 2002/0049527 | A1 | 4/2002 | Kohno et al. |
| 2002/0103583 | A1 | 8/2002 | Ohmura et al. |
| 2002/0198632 | A1 | 12/2002 | Breed et al. |
| 2002/0198660 | A1 | 12/2002 | Lutter et al. |
| 2003/0028292 | A1 | 2/2003 | Ueda |
| 2003/0132840 | A1 | 7/2003 | Bahar |
| 2003/0200227 | A1* | 10/2003 | Ressler ...................... 707/104.1 |
| 2003/0204290 | A1 | 10/2003 | Sadler et al. |
| 2004/0082350 | A1 | 4/2004 | Chen et al. |
| 2004/0267410 | A1 | 12/2004 | Duri et al. |
| 2005/0024189 | A1 | 2/2005 | Weber |
| 2005/0088318 | A1 | 4/2005 | Liu et al. |
| 2005/0107954 | A1 | 5/2005 | Nahla |
| 2005/0131595 | A1 | 6/2005 | Luskin et al. |
| 2005/0143876 | A1 | 6/2005 | Tanase |
| 2006/0030981 | A1 | 2/2006 | Robb et al. |
| 2006/0142933 | A1 | 6/2006 | Feng |
| 2006/0267799 | A1 | 11/2006 | Mendelson |
| 2006/0269078 | A1 | 11/2006 | Sakamoto et al. |
| 2006/0282214 | A1 | 12/2006 | Wolterman |
| 2007/0008181 | A1 | 1/2007 | Rollert et al. |
| 2007/0014423 | A1 | 1/2007 | Darbut et al. |
| 2007/0021915 | A1 | 1/2007 | Breed et al. |
| 2007/0117525 | A1 | 5/2007 | Osafune |
| 2008/0059050 | A1 | 3/2008 | Lin et al. |
| 2008/0060861 | A1 | 3/2008 | Baur et al. |
| 2008/0077326 | A1 | 3/2008 | Funk et al. |
| 2008/0114675 | A1 | 5/2008 | Ward |
| 2008/0133507 | A1 | 6/2008 | Alter et al. |
| 2008/0288162 | A1 | 11/2008 | Theimer |
| 2008/0291054 | A1 | 11/2008 | Groft |
| 2008/0319602 | A1 | 12/2008 | McClellan et al. |
| 2009/0143951 | A1 | 6/2009 | Takahashi et al. |
| 2009/0278806 | A1 | 11/2009 | Duarte et al. |
| 2010/0023223 | A1* | 1/2010 | Huang et al. ................. 340/576 |
| 2010/0076646 | A1* | 3/2010 | Basir et al. .................... 701/35 |
| 2010/0089307 | A1 | 4/2010 | Kenchington |
| 2010/0162319 | A1 | 6/2010 | Piepenbrink et al. |
| 2010/0191584 | A1 | 7/2010 | Fraser et al. |
| 2010/0214411 | A1 | 8/2010 | Weinmann et al. |
| 2010/0227555 | A1 | 9/2010 | Zinn et al. |
| 2010/0302067 | A1 | 12/2010 | Goldman et al. |
| 2010/0305819 | A1 | 12/2010 | Pihlajamaki |
| 2010/0318226 | A1 | 12/2010 | Augusto et al. |
| 2011/0006903 | A1 | 1/2011 | Niem |
| 2011/0009062 | A1 | 1/2011 | Anschutz et al. |
| 2011/0010269 | A1 | 1/2011 | Ballard |
| 2011/0057815 | A1 | 3/2011 | King et al. |
| 2011/0062230 | A1 | 3/2011 | Ward, II et al. |
| 2011/0093149 | A1 | 4/2011 | Tanaka |
| 2011/0095908 | A1 | 4/2011 | Nadeem et al. |
| 2011/0131358 | A1 | 6/2011 | Ganesh et al. |
| 2011/0137773 | A1 | 6/2011 | Davis, III et al. |
| 2011/0194541 | A1 | 8/2011 | Menaceur et al. |
| 2011/0195699 | A1 | 8/2011 | Tadayon et al. |
| 2011/0224875 | A1 | 9/2011 | Cuddihy et al. |
| 2011/0246301 | A1 | 10/2011 | Bae et al. |
| 2011/0264361 | A1 | 10/2011 | Stahlin |
| 2012/0010906 | A1* | 1/2012 | Foladare et al. .................. 705/4 |
| 2012/0083995 | A1 | 4/2012 | Vorona |
| 2012/0095812 | A1 | 4/2012 | Stefik et al. |
| 2012/0101690 | A1 | 4/2012 | Srinivasan et al. |
| 2012/0130580 | A1 | 5/2012 | Omote et al. |
| 2012/0143391 | A1 | 6/2012 | Gee |
| 2012/0231738 | A1 | 9/2012 | Khamharn |
| 2012/0265434 | A1 | 10/2012 | Woodard et al. |
| 2012/0276845 | A1 | 11/2012 | Wikander |
| 2013/0083467 | A1 | 4/2013 | Ricci |
| 2013/0099940 | A1 | 4/2013 | Protopapas |
| 2013/0111408 | A1 | 5/2013 | Berus |
| 2013/0131893 | A1 | 5/2013 | Nakao et al. |
| 2013/0134730 | A1 | 5/2013 | Ricci |
| 2013/0135118 | A1 | 5/2013 | Ricci |
| 2013/0138591 | A1 | 5/2013 | Ricci |

(56) References Cited

U.S. PATENT DOCUMENTS

| | | |
|---|---|---|
| 2013/0138714 A1 | 5/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0152003 A1 | 6/2013 | Ricci et al. |
| 2013/0154298 A1 | 6/2013 | Ricci |
| 2013/0158821 A1 | 6/2013 | Ricci |
| 2013/0166097 A1 | 6/2013 | Ricci |
| 2013/0167159 A1 | 6/2013 | Ricci et al. |
| 2013/0179198 A1 | 7/2013 | Bowne et al. |
| 2013/0241720 A1 | 9/2013 | Ricci et al. |

OTHER PUBLICATIONS

International Search Report and Written Opinion for International (PCT) Patent Application No. PCT/US2013/050600, mailed Jan. 9, 2014 9 pages.
Official Action for U.S. Appl. No. 13/678,710, mailed Dec. 31, 2013 8 pages.
Official Action for U.S. Appl. No. 13/678,726, mailed Nov. 7, 2013 9 pages.
Official Action for U.S. Appl. No. 13/678,726, mailed Jan. 28, 2014 10 pages.
Official Action for U.S. Appl. No. 13/678,745, mailed Feb. 6, 2014 9 pages.
Official Action for U.S. Appl. No. 13/679,292, mailed Nov. 14, 2013 19 pages.
International Search Report and Written Opinion for International (PCT) Patent Application No. PCT/US12/65423 mailed Apr. 26, 2013, 23 pages.
International Search Report and Written Opinion for International (PCT) Patent Application No. PCT/US12/65615 mailed Apr. 30, 2013, 15 pages.
International Search Report and Written Opinion for International (PCT) Patent Application No. PCT/US12/65477 mailed Apr. 26, 2013, 11 pages.
"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).
U.S. Appl. No. 13/462,593, filed May 2, 2012, Ricci et al.
U.S. Appl. No. 13/462,596, filed May 2, 2012, Ricci et al.
U.S. Appl. No. 13/840,240, filed Mar. 15, 2013, Ricci.
"Time-triggered CAN," CIA, © 2001-2013, 4 pages, found at: (www.can-cia.org/index.php?id+166).
Davis et al. "Controller Area Network (CAN) schedulability analysis: Refuted, revisited and revised," Real-Time Systems, Apr. 2007, vol. 35, No. 3, pp. 239-272.
Di Natale "Controller Area Network," Dec. 2009, 54 pages.
Fonseca et al. "Scheduling for a TTCAN network with a stochastic optimization algorithm," Proceedings 8th Internatioanl CAN Conference, Jan. 2002, 7 pages.
HALOsonic (TM) Noise Management Solutions; Internet Article printed on May 2, 2012 from http://www.harman.com/automotive/en-us/products-innovations/innovations/halosonic . . . ; 3 pgs.
Hartwich et al. "CAN Network with Time Triggered Communication," Robert Bosch GmbH Proceedings 7th International CAN Conference, Jul. 2000, 7 pages.
Idstein et al. "Using the Controller Area Network for Communication Between Prostesis Sensors and Control Systems," Proceedings of the 2011 MyoElectric Controls/Powered Prostetics Symposium Fredericton, New Brunswick, Canada, Aug. 14-19, 2011, 4 pages.
Lotus Evora 414E Hybrid 2010; Internet Article printed on May 2, 2012 from http://www.dieselstation.com/cars/lotus-evora-414e-hybrid-2010-a2543.html; 5 pgs.
Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).
Marturano "General Motors Takes a CUE from Customers," InContext, Nov. 8, 2011, 3 pages, found at: (incontextdesign.com/blog/general-motors-takes-a-cue-from-customers/).
Official Action for U.S. Appl. No. 13/678,745, mailed Oct. 1, 2013 8 pages.
Notice of Allowance for U.S. Appl. No. 13/678,722, mailed Aug. 14, 2014 8 pages.
Official Action for U.S. Appl. No. 13/678,753, mailed Jul. 11, 2014 13 pages.
Official Action for U.S. Appl. No. 13/679,306, mailed Sep. 3, 2014 10 pages.
Official Action for U.S. Appl. No. 13/679,369, mailed Jul. 3, 2014 12 pages.
Official Action for U.S. Appl. No. 13/679,400, mailed Aug. 6, 2014 17 pages.
Notice of Allowance for U.S. Appl. No. 13/678,710, mailed Oct. 24, 2014 6 pages.
Notice of Allowance for U.S. Appl. No. 13/678,726, mailed Aug. 18, 2014 7 pages.
Official Action for U.S. Appl. No. 13/678,735, mailed Oct. 10, 2014 9 pages.
Official Action for U.S. Appl. No. 13/679,680, mailed Oct. 23, 2014 21 pages.
"A8: Technology as standard," Screen-shots from Audi.co.uk, 2014 [retrieved on Apr. 16, 2014], 1 page. Retrieved from: www.audi.co.uk/new-cars/a8/a8/technology-as-standard/mmi-touch.html.
"Audi A8 MMI Touch," Audi of America, Jan. 7, 2011, [retrieved on Apr. 16, 2014], 2 pages. Retrieved from: www.youtube.com/watch?v=O2nZ-WHo9IA.
"Halosonic: Sound Technology with Vision," news article, Feb. 21, 2012, found at: www.lotuscars.comb/gb/news/engineering/haosonic-sound-technology-vision, 1 page.
Diaz, "Audi New MMI Touch Input System Makes Perfect Sense," Gizmodo.com, Dec. 1, 2009 [retrieved on Apr. 16, 2014], 12 pages. Retrieved from: http://gizmodo.com/5416342/audi-new-mmi-touch-input-system-makes-perfect-sense.
International Preliminary Report on Patentability for International (PCT) Patent Application No. PCT/US12/65423 mailed May 20, 2014, 17 pages.
International Preliminary Report on Patentability for International (PCT) Patent Application No. PCT/US12/65615 mailed May 20, 2014, 10 pages.
Official Action for U.S. Appl. No. 13/678,710, mailed Jun. 9, 2014 10 pages.
Official Action for U.S. Appl. No. 13/678,722, mailed Mar. 27, 2014 6 pages.
Notice of Allowance for U.S. Appl. No. 13/678,726, mailed Mar. 28, 2014 7 pages.
Official Action for U.S. Appl. No. 13/678,735, mailed Apr. 24, 2014 9 pages.
Official Action for U.S. Appl. No. 13/678,745, mailed May 23, 2014 9 pages.
Official Action for U.S. Appl. No. 13/679,306, mailed May 7, 2014 7 pages.
Notice of Allowance for U.S. Appl. No. 13/679,292, mailed Apr. 10, 2014 8 pages.
Official Action for U.S. Appl. No. 13/679,400, mailed Apr. 18, 2014 10 pages.

* cited by examiner

METHOD AND SYSTEM FOR MAINTAINING AND REPORTING VEHICLE OCCUPANT INFORMATION

CROSS REFERENCE TO RELATED APPLICATION

The present application claims the benefits of U.S. Provisional Application Ser. Nos. 61/560,509, filed Nov. 16, 2011; 61/637,164, filed Apr. 23, 2012; and 61/663,335, filed Jun. 22, 2012, all entitled "COMPLETE VEHICLE ECOSYSTEM", 61/646,747, filed on May 14, 2012, entitled "Branding of Electrically Propelled Vehicles Via the Generation of Specific Operating Sounds"; 61/653,275, filed on May 30, 2012, entitled "Vehicle Application Store for Console"; 61/653,264, filed on May 30, 2012, entitled "Control of Device Features Based on Vehicle State"; 61/653,563, filed on May 31, 2012, entitled "Complete Vehicle Ecosystem"; 61/672,483, filed on Jul. 17, 2012, entitled "Vehicle Climate Control"; 61/714,016, filed on Oct. 15, 2012, entitled "Vehicle Middleware"; and 61/715,699, filed Oct. 18, 2012, entitled "Vehicle Middleware"; each of which is incorporated herein by this reference in its entirety.

Cross reference is made to U.S. patent application Ser. Nos. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/462,596, filed on May 2, 2012, entitled "Configurable Heads-Up Dash Display"; Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/678,762, filed on Nov. 16, 2012, entitled "Behavioral Tracking and Vehicle Applications"; Ser. No. 13/679,292, filed Nov. 16, 2012, entitled "Branding of Electrically Propelled Vehicles Via the Generation of Specific Operating Output"; Ser. No. 13/679,400, filed Nov. 16, 2012, entitled "Vehicle Climate Control"; Ser. No. 13/840,240, filed on Mar. 15, 2013, entitled "Controller Area Network Bus"; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

FIELD

The disclosure relates generally to vehicle data collection systems.

BACKGROUND

Vehicles are becoming increasingly artificially intelligent with wireless communication capabilities. Most vehicles on the road today are controlled, in whole or part, by computers. This intelligence has been underutilized for applications largely unrelated to vehicle control.

Satellite positioning systems have enabled not only a vehicle to locate itself but also to communicate with remote entities.

There is a need for a vehicle that can communicate with other vehicles and provide updated occupant information to third parties.

SUMMARY

These and other needs are addressed by the various aspects, embodiments, and/or configurations of the present disclosure. The present disclosure is directed to a vehicular wireless network for collecting, maintaining and reporting to a third party occupant information.

The vehicle can include an occupant information module to maintain, in vehicle memory, occupant information for at least one vehicle occupant and report the occupant information to a third party, the occupant information comprising plural of occupant identity, occupant occupation, occupant employer, occupant socioeconomic status, occupant business address, occupant residential address, occupant interest, occupant disinterest, occupant driving history, occupant current and/or historic driving behavior and/or pattern, occupant interpersonal associations with other persons, current vehicle location, and criminal history.

The occupant information module can report the occupant information to a law enforcement authority and wherein the occupant information comprises occupant identity.

The occupant information can include criminal history.

The occupant information can be at least one of driving history, occupant current and/or historic driving behavior and/or pattern and wherein the third party is an insurance company having an insurance policy on the vehicle.

The occupant information module can determine, using information received from a law enforcement database, a criminal history of an possible vehicle occupant. The occupant information module can compare a current vehicle location to a physical location associated with a listed criminal offender, and, when the physical location is within a selected spatial distance of a current location of the vehicle when parked, a possible association between the criminal offender and the vehicle.

The occupant information module can notify an occupant of a different vehicle of the criminal history of the vehicle occupant.

The occupant information module can notify the third party of the possible association when a frequency of the vehicle being spatially proximal to the physical location is at least a selected threshold.

The vehicle described in the present disclosure can provide a number of advantages. For example, the vehicle can expand dramatically sources of information to verify map integrity and accuracy, thereby avoiding map obsolescence due, for example, to changes in roadway configurations and detours. It can provide a central repository for information regarding road, traffic, and weather conditions. Using vehicles as data collection sources can provide an extensive network capable of quickly, efficiently and accurately collecting information. By providing occupant information to a central repository or other vehicles, a vehicle can provide warnings regarding behavior or potential behavior of an occupant and medical conditions of the occupant. Assignment of an IPv6 address to the vehicle can provide an address to locate the vehicle on the Internet, simplify implementing cyber security, enable applications that support safety and data collection for predictive analytics, enable voice-over-IP calls from the vehicle, and furnish reliable presence information to a presence service or server.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "automotive navigation system" is a satellite navigation system designed for use in automobiles. It typically uses an SPS navigation device to acquire position data to locate the user on a road in the unit's map database. Using the road database, the unit can give directions to other locations along roads also in its database. Dead reckoning using distance data from sensors attached to the drivetrain, a gyroscope and an accelerometer can be used for greater reliability, as SPS signal loss and/or multipath can occur due to urban canyons or tunnels.

The term "bus" and variations thereof, as used herein, refers to a subsystem that transfers information and/or data between various components. A bus generally refers to the collection communication hardware interface, interconnects, bus architecture, and/or protocol defining the communication scheme for a communication system and/or communication network. A bus may also specifically refer to a part of a communication hardware that interfaces the communication hardware with the interconnects that connect to other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, SPS modules, portable music players, and other Internet-enabled and/or network-connected devices.

The term "communication system" or "communication network" and variations thereof, as used herein, refers to a collection of communication components capable of one or more of transmission, relay, interconnect, control, or otherwise manipulate information or data from at least one transmitter to at least one receiver. As such, the communication may include a range of systems supporting point-to-point to broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e. an antenna) and running software capable of using the communication means to send a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "dash" and "dashboard" and variations thereof, as used herein, are used interchangeably and include any panel and/or area of a vehicle disposed adjacent to an operator, user, and/or passenger. Typical dashboards may include but are not limited to one or more control panel, instrument housing, head unit, indicator, gauge, meter, light, audio equipment, computer, screen, display, HUD unit, and graphical user interface.

The terms "determine", "calculate" and "compute," and variations thereof, as used herein, are used interchangeably and include any type of methodology, process, mathematical operation or technique.

The term "display" refers to a portion of a screen used to display the output of a computer to a user.

The term "displayed image" or "displayed object" refers to an image produced on the display. A typical displayed image is a window or desktop or portion thereof, such as an icon. The displayed image may occupy all or a portion of the display.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

A "mobile ad-hoc network" (MANET) is a self-configuring infrastructureless network of mobile devices connected by wireless. Ad hoc is Latin and means "for this purpose". Each device in a MANET is free to move independently in any direction, and will therefore change its links to other devices frequently. Each must forward traffic unrelated to its own use, and therefore be a router. The primary challenge in building a MANET is equipping each device to continuously maintain the information required to properly route traffic. Such networks may operate by themselves or may be connected to the larger Internet. MANETs are a kind of wireless ad hoc networks that usually has a routable networking environment on top of a Link Layer ad hoc network.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates. The touch screen may or may not include a proximity sensor to sense a nearness of object, such as a user digit, to the screen.

The term "vehicle" refers to a device or structure for transporting animate and/or inanimate or tangible objects (e.g., persons and/or things), such as a self-propelled conveyance. The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, aircraft, space craft, flying machines, human-powered conveyances, and the like.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Overview

The present disclosure describes a vehicle implementing one or more processing modules. These modules are configured to connect and interface with the various buses in the vehicle, where the various buses are connected with the various components of the vehicle to facilitate information transfer among the vehicle components. The vehicle includes a processing module to collect and report mapping information, update on board maps based on collected mapping information, and report the whereabouts of felons and other persons of interest.

The Vehicle

Figure 1:
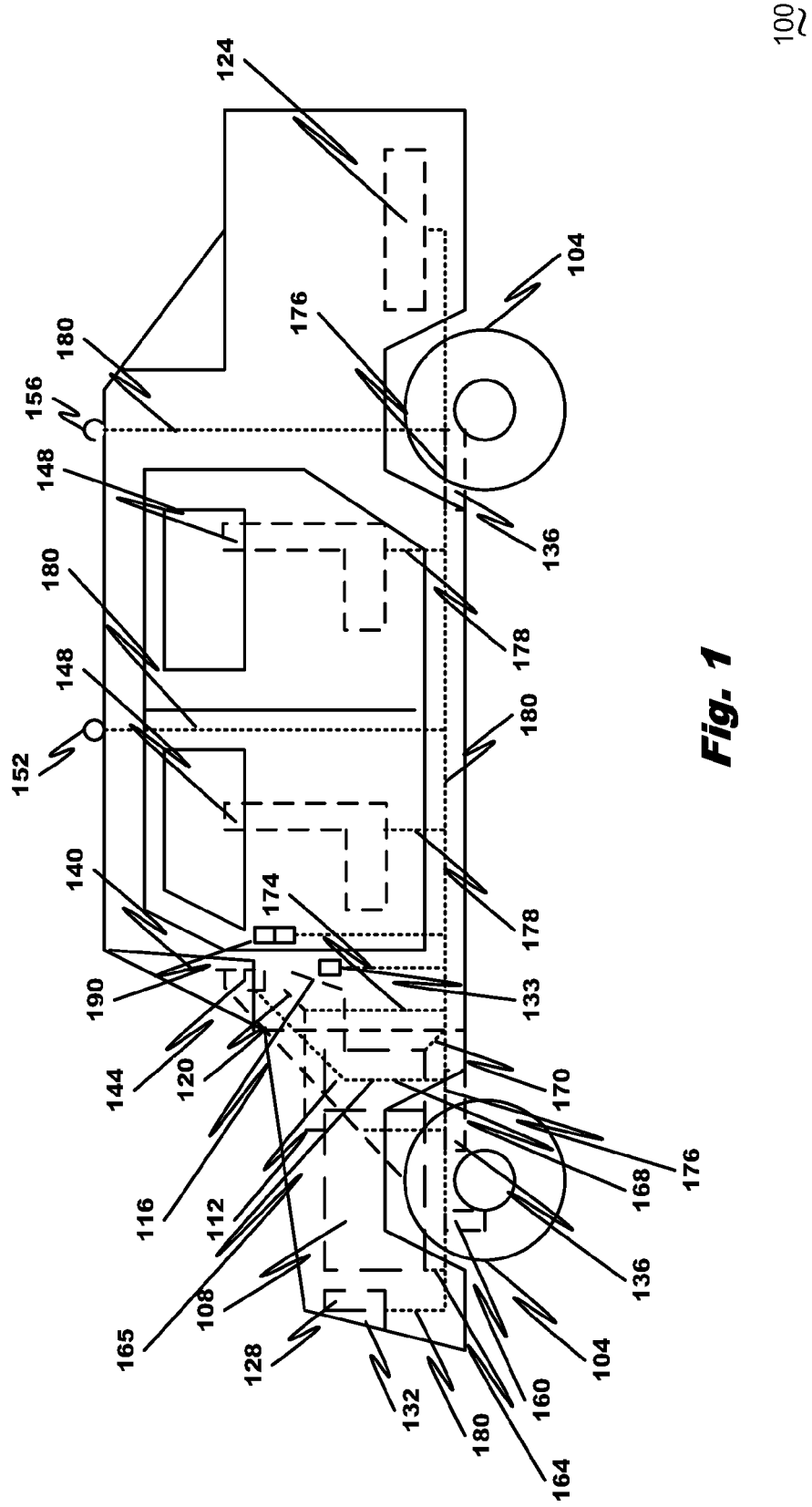
FIG. 1 depicts a vehicle configured in accordance with an embodiment.
Figure 2:
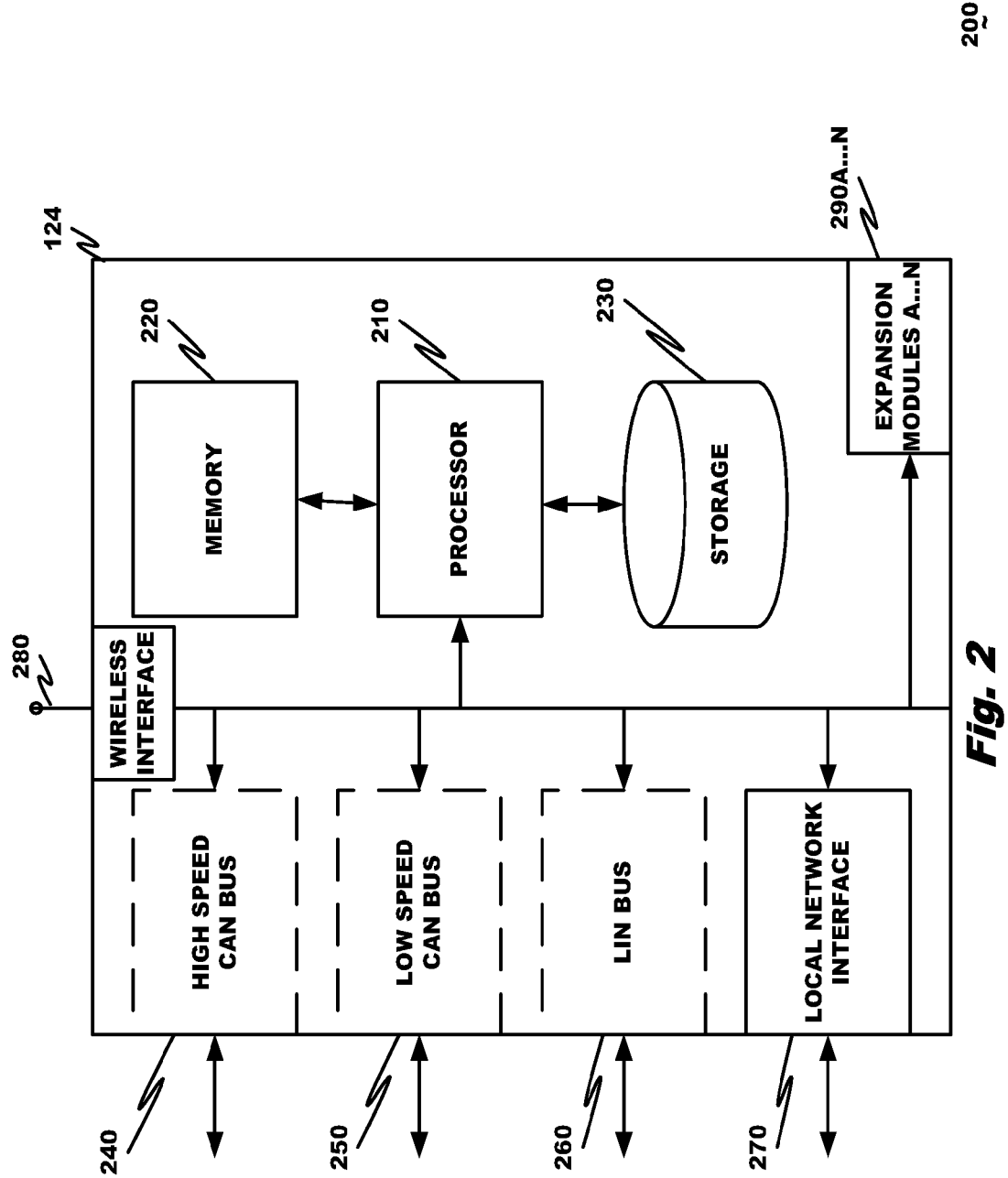
FIG. 2 is a block diagram of a processing module according to an embodiment.
Figure 3:
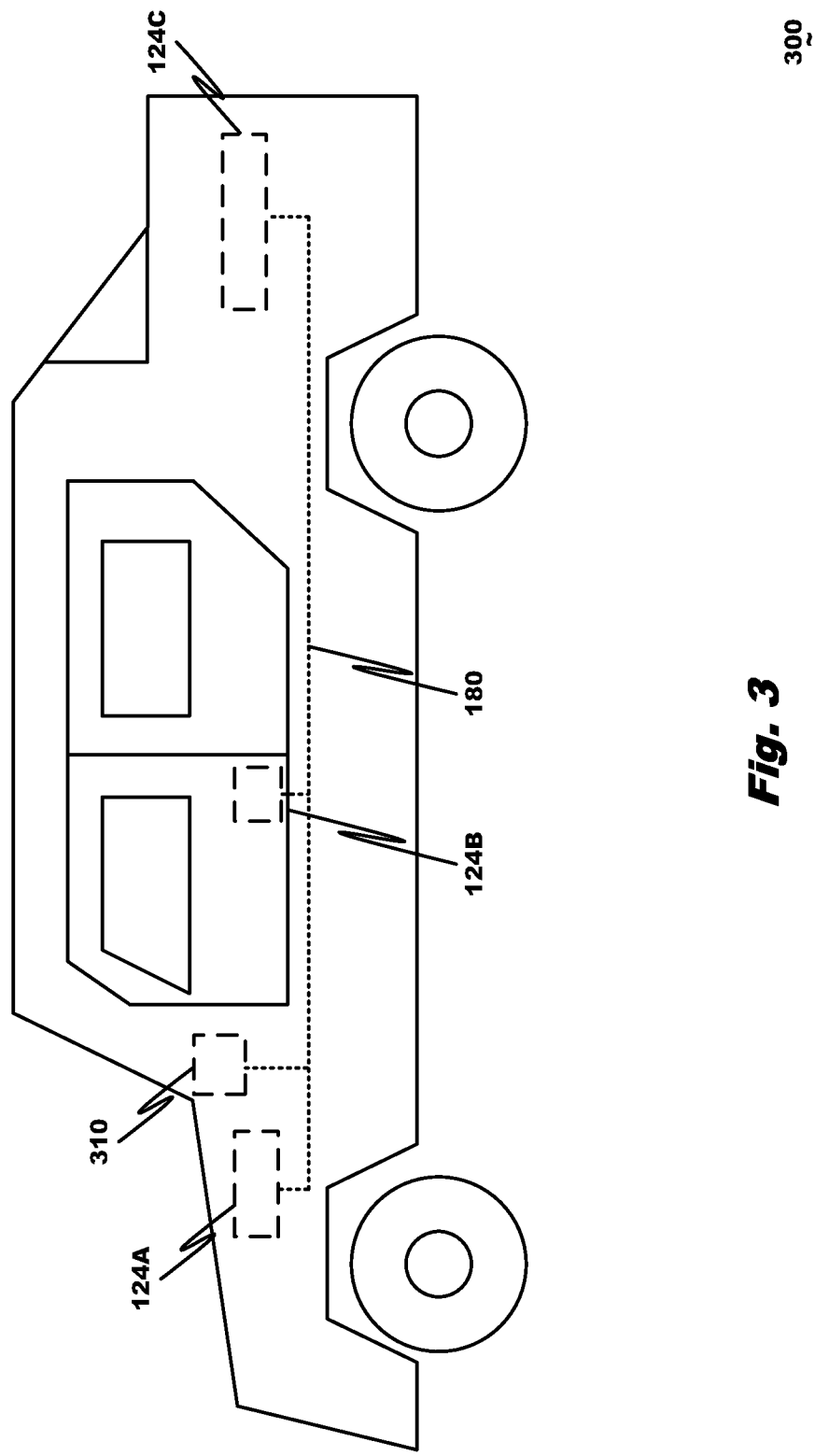
FIG. 3 depicts a vehicle implementing processing modules configured in according with an embodiment.

FIGS. 1-3 collectively illustrate a vehicle 100 incorporating various features.

Referring to FIG. 1, the vehicle 100 includes, among many components common to vehicles, wheels 104, a power source 108 (such as an engine, motor, or energy storage system (e.g., battery or capacitive energy storage system)), a manual or automatic transmission 112, a manual or automatic transmission gear controller 116, a power controller 120 (such as a throttle), a braking system 136, a steering wheel 140, a display panel 144 (e.g., a dashboard displaying information regarding components in vehicle 100), and an occupant seating system 148.

Other components in vehicle 100 include communication components such as a wireless signal receiver 152 to receive wireless signals from signal sources such as roadside beacons and other electronic roadside devices, and a satellite positioning system ("SPS") receiver 156 (e.g., a Global Positioning System ("GPS") (US), GLONASS (Russia), Galileo positioning system (EU), Compass navigation system (China), and Regional Navigational Satellite System (India) receiver).

The vehicle 100 also includes a number of control units and sensors for the various components of vehicle 100. Exemplary control units and sensors therefor include wheel state sensor 160 to sense one or more of vehicle speed, acceleration, deceleration, wheel rotation, wheel speed (e.g., wheel revolutions-per-minute), wheel slip, and the like. Power source controller and energy output sensor 164 controls the power source and to senses a power output of the power source 108. Example aspects of power source controller and energy output sensor 165 include balancing the mixture of fuel (e.g. gasoline, natural gas, or other sources of fuel) and other elements (e.g. air for combustion) and measuring one or more of current engine speed (e.g., revolutions-per-minute), energy input and/or output (e.g., voltage, current, fuel consumption, and torque), and the like. Switch state control unit 168 activates or deactivates the power source (e.g. the ignition). Transmission control unit ("TCU") 170 sets the current state the transmission (e.g., gear selection or setting) based on the state of gear controller 116. Power control unit 174 sets the throttle for power source 108 given the state of power controller 120. Brake control unit 176 operates the current state (braking or non-braking) of braking system 136 based on the state of the brake controller (which could be linked to power controller 120).

Vehicle 100 also includes other control units and sensors for safety purposes. An airbag deployment system includes an airbag deployment control unit 133 and a collision sensor 132. When a collision is detected by collision sensor 132, data is sent to airbag release control unit 133 which determines whether to deploy the airbag based on the data received (e.g., the speed of the collision and the area of impact to determine whether an airbag deployment can promote safety). Other safety components include seat belt control unit and sensors for setting the seat belt (e.g. engaging or disengaging the seat belt during hard breaking), head light control unit and sensors for headlight 128 and other lights (e.g. emergency light, brake light, parking light, fog light, interior or passenger compartment light, and/or tail light state (on or off)), door settings (locking and unlocking), window settings (opening or closing), one or cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, and other components and sensors as known in the art.

Vehicle 100 further includes components for the convenience and enjoyment of the occupants or operators. Seating system controller and sensor 178 sets the position and other settings of a seat and measure various attributes of an occupant of the seat (e.g., the current weight of seated occupant) in a selected seat of the seating system 148. Entertainment system 190, preferably located in the head unit of the passenger compartment, provides entertainment options such as music or video for occupants of vehicle 100.

Examples of other vehicle components include one or more cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, odometer reading sensor, trip mileage reading sensor, wind speed sensor, radar transmitter/receiver output, brake wear sensor, steering/torque sensor, oxygen sensor, ambient lighting sensor, vision system sensor, ranging sensor, parking sensor, heating, venting, and air conditioning (HVAC) sensor, water sensor, air-fuel ratio meter, blind spot monitor, hall effect sensor, microphone, radio frequency (RF) sensor, infrared (IR) sensor, vehicle control system sensors, wireless network sensor (e.g., Wi-Fi and/or Bluetooth sensor), cellular data sensor, and other sensors known to those of skill in the vehicle art.

Vehicle 100 includes one or more vehicle buses 180 for connecting the various components and systems of vehicle 100 as described above. In modern vehicles, subsystems such as an anti-lock braking system (ABS), which may be used by brake control unit 176 and braking system 136, engine control unit (ECU), which may be used by power source control 164, transmission control unit (TCU), which may be used by transmission control unit 170 and gear controller 116, and supplemental restraint system (SRS), such as airbag deployment control unit 133 and collision sensor 132 and seating system controller and sensor 178, are frequently interconnected using a standardized bus. Standardized buses for use in vehicles include Controller Area Network (CAN), and Local Interconnect Network (LIN) and others, as are known in the art. In particular, these components and subsystems may use the high-speed CAN bus for real-time information. Other components with lower priorities may use the low-speed CAN bus to transmit information. Vehicle bus 180 (which is optional) is illustrated as one bus in FIG. 1. However, vehicle 100 may include one or more of these standardized buses, such as a combination of the high-speed and low-speed CAN, LIN, and/or other buses. Also, vehicle bus 180 may further include and support extensions to standardized buses, such as the FlexCAN extension to the CAN bus. Further, vehicle bus 180 may include standardized communication networks that can be implemented vehicle 100. Well known networks include Ethernet, Wi-Fi, USB, $I^2C$, RS232, RS485 and FireWire.

Vehicle 100 also includes processing module 124. Preferably, processing module 124 is placed in the trunk, hood (not shown), behind the head unit (not shown), and/or other accessible but unseen locations. Processing module 124 is coupled to vehicle bus 180 and provides processing for data related to vehicle bus 180 and other vehicle components.

Processing modules, for example, can perform, monitor, and/or control critical and non-critical tasks, functions, and operations, such as interaction with and/or monitoring and/or control of critical and non-critical on board sensors and vehicle operations (e.g., engine, transmission, throttle, brake power assist/brake lock-up, electronic suspension, traction and stability control, parallel parking assistance, occupant protection systems, power steering assistance, self-diagnostics, event data recorders, steer-by-wire and/or brake-by-wire operations, vehicle-to-vehicle interactions, vehicle-to-infrastructure interactions, partial and/or full automation, telematics, navigation/SPS, multimedia systems, audio systems, rear seat entertainment systems, game consoles, tuners (SDR), heads-up display, night vision, lane departure warning, adaptive cruise control, adaptive headlights, collision warning, blind spot sensors, park/reverse assistance, tire pressure monitoring, traffic signal recognition, vehicle tracking (e.g., LoJack™), dashboard/instrument cluster, lights, seats, climate control, voice recognition, remote keyless entry, security alarm systems, and wiper/window control). Processing modules can be enclosed in an advanced EMI-shielded enclosure containing multiple expansion modules. Processing modules can have a "black box" or flight data recorder technology, containing an event (or driving history) recorder (containing operational information collected from vehicle on board sensors and provided by nearby or roadside signal transmitters), a crash survivable memory unit, an integrated controller and circuitry board, and network interfaces. Processing module 124 is further disclosed with reference to FIG. 2.

With reference to FIG. 3, multiple processing modules 124a-c may be located at various disparate, spaced apart locations in a common vehicle. The multiple distributed locations of the processing modules provide redundancy in the event of a collision or other catastrophic event. For example, a collision with the rear of the vehicle 100 may damage one processing module 124c but not processing modules 124a and b in a forward area of the vehicle 300.

A user can be an occupant of a vehicle 100 that implements the system of FIG. 1. A user can further be an assembler, technician, or mechanic working on the vehicle to configure the system of FIG. 1 for use by an end-user of the vehicle.

FIG. 2 illustrates an exemplary block diagram for a (primary and/or secondary) processing module 124a-c.

Processing module 124 may include processor 210, memory 220, storage 230, and interfaces for one or more buses 240-270. Among the interfaces 240-270 include high-speed CAN bus 240, low-speed CAN bus 250, LIN bus 260, network interface 270, and/or wireless interface 280. One skilled in the art will recognize that processing module 124 may take other configurations and with other buses as known in the art, and interfaces 240-290 may be implemented with more or fewer buses than those shown.

The operations of processing module 124 will now be described with respect to the high-speed CAN bus interface 240 and low-speed CAN bus interface 250 as an exemplary configuration in one embodiment of the invention. In one implementation, processing module 124 receives data transmitted over vehicle bus 180 through high-speed CAN bus interface 240 and/or low-speed CAN bus interface 250. Data transmitted over the high-speed CAN bus includes priority data from subsystems such as anti-lock braking system (ABS), which may be used by brake control unit 176 and braking system 136, engine control unit (ECU), which may be used by power source control 164, transmission control unit (TCU), which may be used by transmission control unit 170 and gear controller 116, and supplemental restraint system (SRS), such as airbag deployment control unit 133 and collision sensor 132 and seating system controller and sensor 178, as described above. Data transmitted over the low-speed CAN bus includes other noncritical data, such as engine temperature and oil pressure sensor readings.

Wireless interface 280, by contrast, can be a transceiver for one or more long, intermediate, or short range wireless networks, such as a radio (e.g., cellular such as CDMA, GSM, or IS-95 network), 802.X, a WiFi™ network, a Bluetooth™ network, and the like, sending and receiving a wide variety of information, including lower priority information, such as data for the convenience and enjoyment of the occupants in entertainment system 190 or seating system 148. The wireless interface 280 can access information over one or more wireless networks using an appropriate protocol, such as the Wireless Application Protocol, Wireless Internet Protocol, Wireless Session Protocol, Bluetooth Wireless Protocol, Wireless Datagram Protocol, Wireless HART Protocol, Wired Equivalent Privacy (WEP), MiWi and MiWi P2P, RuBee (IEEE standard 1902.1), Wireless USB, Wireless Transport Layer Security (WTLS), and the like. In one vehicle configuration, the wireless interface 280 connects, via a short distance protocol such as Bluetooth™ or WiFi™, to an external computational device, such as a cell phone or tablet computer, for access to remote nodes over the Internet.

Local network interface 270 is a transceiver for signals exchanged with other on board components of the vehicle (including the components discussed above with respect to FIG. 1). The signals may be sent over a wired or wireless (or combination thereof) network. In one configuration, the local network interface is a wireless access point. Any suitable local area network protocol may be used, with the Ethernet protocol and the short-range protocols mentioned above being examples.

The processor 210 may comprise a general purpose programmable (micro) processor or controller for executing application programming or instructions. In accordance with at least some embodiments, the processor 210 may include multiple processor cores, and/or implement multiple virtual processors. In accordance with still other embodiments, the processor 210 may include multiple physical processors. As a particular example, the processor 304 may comprise a specially configured application specific integrated circuit (ASIC) or other integrated circuit, a digital signal processor, a controller, a hardwired electronic or logic circuit, a programmable logic device or gate array, a special purpose computer, or the like. The processor 210 generally functions to run programming code or instructions implementing various functions of the device 200.

Memory 220 is for use in connection with the execution of application programming or instructions by the processor 210, and for the temporary or long term storage of program instructions and/or data. As examples, the memory 220 may comprise RAM, DRAM, SDRAM, or other solid state memory. Alternatively or in addition, data storage 230 may be provided. Like the memory 220, the data storage 230 may comprise a solid state memory device or devices. Alternatively or in addition, the data storage 230 may comprise a hard disk drive or other random access memory.

In one application, processing module 124 is configured to process information sent over the CAN buses. As priority data is received by processing module 124 from high-speed CAN bus interface 240 and/or low-speed CAN bus 250, processing module 124 may determine the nature of the received data and independently do further processing on the received data. In a preferred embodiment, processor 210 executes instructions stored in memory 220 to perform these functions. Further, memory 220 serves as stores and retrieves for data by processor 210.

In one configuration, processing module 124 only receives data over high-speed CAN bus 240 and may send the data back over low-speed CAN bus 250. As the CAN bus provides arbitration-free transmission, processing module 124 may passively listen to information traffic, which includes priority data from the various components as discussed, sent over high-speed CAN bus 240. Processing module 124 then determines if a piece of received information may need further processing and should be sent to devices via low-speed CAN bus 250.

For example, collision sensor 132 may have detected a frontal collision. In one data path, collision sensor 132 may send a signal with details to the collision (i.e. areas of impact and/or force and/or velocity of impact) over high-speed CAN bus 240 with specific target to airbag release control unit 133 to potentially deploy the airbags once airbag release control unit 133 determines that it is suitable to do so upon the receipt of the sent data. Since the CAN bus is arbitration-free, processing module 124 also receives the collision information from collision sensor 132. Processing module 124 then processes the information received to determine to relay the information to an information display (i.e., display console of entertainment system 190) via the low speed CAN bus 250.

It is noted that the data rate is limited in the current implementations of the CAN bus. However, future implementations may allow for higher speeds such that the CAN bus may support data rate suitable for multimedia application. In these implementations, processing module 200 may be configured to leverage the CAN bus for multimedia use. For example, real-time multimedia information (i.e. analog/digital radio or television signal) may be received by an antenna and transmitted through a CAN bus via processing unit 200 to entertainment system 190. At some point in time, one component of vehicle 100 may have suffered a malfunction that requires information the driver. In the default implementation of the CAN bus, the higher priority signal from the malfunctioning component will have priority over the multimedia information. With the leveraged CAN bus by processing module 200, the high priority signal from the malfunctioning component can be further processed by processor 210. If processor 210 determines that the malfunction is minor, processor 210 may relay the malfunction information to the low speed CAN bus 250 but being mixed in with the multimedia information such that there is little disruption to playing backing the multimedia information. Further, processor 210 may also consider if the malfunction requires further processing such as notification to a repair facility or emergency services.

In another configuration, processing module 200 may leverage other buses such as the network interface 270 and/or wireless interface 280 that have more bandwidth for the data. For example, while the present implementation of the CAN bus would not support multimedia information with any substantial bit rate, the network interface 270 may be leveraged such that while CAN bus information is received via the high speed CAN bus 240, multimedia information is relayed separately via the network interface 270. This enables the processing module 200 to implement the previous example discussed involving relaying information regarding malfunctioning component without waiting for a future implementation of the CAN bus.

In another application, a processing module 124 may add further expansion modules 290A-N for further capabilities. For example, expansion modules 290A-N may contain a cellular telephony module. The cellular telephony module can comprise a GSM, CDMA, FDMA, or other digital cellular telephony transceiver and/or analog cellular telephony transceiver capable of supporting voice, multimedia and/or data transfers over a cellular network. Additionally, expansion modules 290A-N can include other cellular telephony modules from different providers or modes for other wireless communications protocols. As examples, the modules for other wireless communications protocols can include a Wi-Fi, BLUETOOTH™, WiMax, infrared, or other wireless communications link. The cellular telephony module and the other wireless communications module can each be associated with a shared or a dedicated antenna. Further, expansion modules 290A-N may also include other wired bus modules that may connect to additional essential and nonessential vehicle components that may be installed or upgraded in the future. Processing modules 290A-N may contain functions critical to the operation of the vehicle such as engine control (ECU), transmission control (TCU), airbag control, various sensors, or other operational or safety related components. Further, processing modules 290 may take on more processing duties from a vehicle component 310 connected to bus 380. Thus, processing modules 124A-C benefits from redundancy in the case that one of modules malfunctions. Further, in a vehicle collision, it is expected that at least some of the processing modules may totally malfunction. In these cases, the remaining processing modules may take over limited or full processing duties of the malfunctioning vehicle components 310 or processing modules 124A-C.

In one configuration, processor 210, memory 220, storage 230, and the bus interfaces 240-280 may also be expansion modules similar to 290A-N. For example, processor 210 may be initially implemented as an OMAP 4 processor. In the future, OMAP 5 processors may be developed and processor 210 may be upgraded as a modular component.

In another application, processing module 124 is able to support additional vehicle hardware and/or software components that are added to the vehicle and is connected to processing module 124 via a bus. For example, vehicle 100 may have installed an additional entertainment system. In one configuration, processing module 124 can treat the additional component that is connected to processing module 200 via a bus as an expansion module 290A-N.

In another configuration, the additional hardware and/or software component may require further processing for it to work with processing module 124. For example, the bus protocol may need to be modified to support communicating with the additional component because the additional component has capabilities beyond the existing protocol (i.e., an extension to an existing bus architecture). In one implementation, processing module 124 must first check to ensure that the additional component complies with OEM defined standards such that rogue components not recognized for a particular vehicle would not be supported.

FIG. 3 depicts a vehicle 300 with multiple processing modules according to an embodiment. Vehicle 300 includes bus 180, vehicle component 310, and processing modules 124A-C.

Vehicle component 310 is an exemplary vehicle component for illustration purposes that is connected to bus 380. Vehicle component 310 may represent any of the vehicle components discussed in connection with vehicle 100 (FIG. 1).

Each of the processing modules 124A-C is each coupled to bus 180. Processing module 124A is located in the engine compartment of vehicle 300; processing module 124B is located in the passenger compartment of vehicle 300; and processing module 124C is located in the truck of vehicle 300.

In one configuration, some of the processing modules 324A-C may have limited processing functions as compared to the others. For example, processing module 124A may act as the default processing module for vehicle 300 normally because of its location being close to most critical vehicle components in the engine compartment (i.e., ECU, TCU). If the other processing modules 124B-C are only needed for redundancy, they may be implemented to only have limited capabilities (i.e., these processing modules would not be require to have processing all critical and non-critical functions). This implementation has the advantage of reduced costs and/or space as compared to fitting processing module will full capabilities. The processing modules 124A-C may also have cascading levels of capabilities. For example, processing module 124B is fitted in the passenger compartment and is deemed to most likely survive a collision; it may be required to have capabilities critical to vehicle operation but no other capabilities to save space in the passenger compartment. Processing module 124C may have additional capabilities such as a cellular module so that emergency calls may be automatically placed if the default processing module 124A fails.

In another configuration, each of the processing modules 124A-C may have different capabilities. For example, processing module 124A may have capabilities only for critical vehicle functions; processing module 124C may have capabilities only for non-critical vehicle functions; and processing module 124B may be reserved for back-up processing of both critical and non-critical vehicle functions. In one implementation, processing may be off-loaded to another processing module if one module becomes overloaded. This configuration has the advantage further reduction in costs and space because processing power is not wasted due to redundancy. In the case where one processing module malfunctions, the other processing modules may pick up processing duties via a processor off-load procedure. If there is not enough processing power all wanted functionalities, the processing modules may work together to prioritize critical vehicle functions ahead of non-critical functions.

Figure 4:
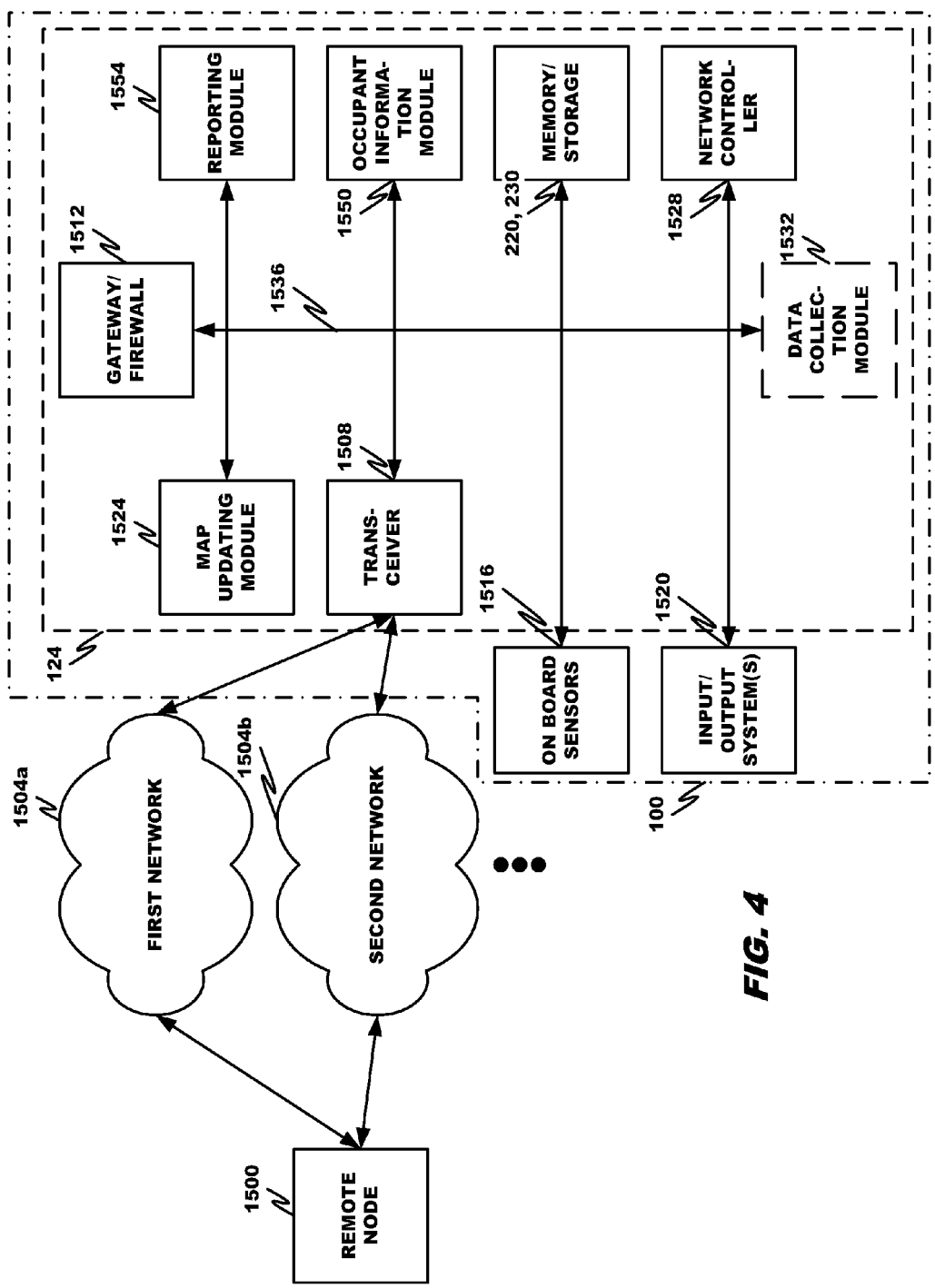
FIG. 4 is a block diagram depicting a vehicle communication system according to an embodiment.

FIG. 4 depicts the vehicle 100 in communication, via first, second, . . . networks 1504 a, b, . . . , with a remote node 1500, such as a computational device, e.g., a server, mobile phone, tablet computer, laptop computer, personal computer, and the like, of the vehicle owner, law enforcement authority, insurance company, vehicle or parts manufacturer/vendor (e.g., to provide vehicle diagnostics, maintenance alerts, vehicle or part recall notifications, and/or predictive analytics), a service provider (e.g., a convenience service provider such as a service to connect the vehicle operator with a dealer, a service to locate the vehicle, a service to provide vehicle information and/or feature assistance, an automotive navigation system and a service to start a vehicle (OnStar™ being an example), a location-based service provider (e.g., traffic and/or weather reporting and/or adviser on gas, accommodations, navigation, parking assistance, and/or food), Internet content provider, software vendor, concierge service provider, a processing module of another vehicle, a roadside monitor, sign, beacon, and the like, to name a few.

The first, second, . . . networks 1504a, b, . . . can be any wireless network, such as a radio or cellular network (e.g., CDMA, CDMA2000, AMPS, D-AMPS, TACS, ETACS, CSK, CDMAOne, GSM, EDGE, GPRS, HSCSD, UMTS, WCDMA, HSPA, WIMAX, WIMAX ADVANCED, LTE ADVANCED, or FDMA in accordance with the 1G, 2G, 2G transitional, 3G, 3G transitional, 4G or 5G cellular network standards), a Wi Fi network, a Bluetooth network, and the like.

The vehicle 100 includes on board sensors 1516 (discussed above with reference to FIG. 1), input/output systems 100, on board sensors 1516, and processing module 124. The processing module 124, in turn, includes a transceiver 1508 to send and receive signals over a selected one of the first, second, . . . networks 1504 a, b, . . . , a gateway/firewall 1512 to provide secure connectivity between the various components of the vehicle 100 and the first, second, . . . networks 1504a, b, . . . , optionally a data collection module 1532 to collect information both internally and externally, an occupant information module 1550 to collect occupant-related information, a map updating module 1524 to update locally or remotely stored map information, a reporting module 1554 to provide information to a vehicle occupant, and network controller 1528 to supervise local networks and nodes thereof and discover and maintain data structures, such as network connectivity maps or network topology, describing discovered network nodes. As will be appreciated, the logic for the data collection module 1532, occupant information module 1550 to access and/or maintain occupant information, map updating module 1524, reporting module 1554, gateway/firewall 1512, and network controller 1528 can be contained within memory/storage 220, 330. The various components are connected by a bus, wireless network, or combination thereof (denoted by reference 1536).

The gateway/firewall 1512 can be any suitable module that can maintain secure connectivity. The need for the gateway/firewall is necessitated by the assignment of a wireless data network address, such as defined by IPv6 (Internet Protocol version 6), with the corresponding processing module 124. As will be appreciated, IPv6 addresses, as commonly displayed to users, consist of eight groups of four hexadecimal digits separated by colons, for example 2001:0 db8:85a3: 0042:0000:8a2e:0370:7334.

Each processing module 124 can have an independent network address or use a common network address. The gateway can be any module equipped for interfacing with another network that uses one or more different communication protocols. The firewall can use any technique to maintain security, including network address translation, network layer or packet filtration, application-layer firewall, and the like.

Figure 5:
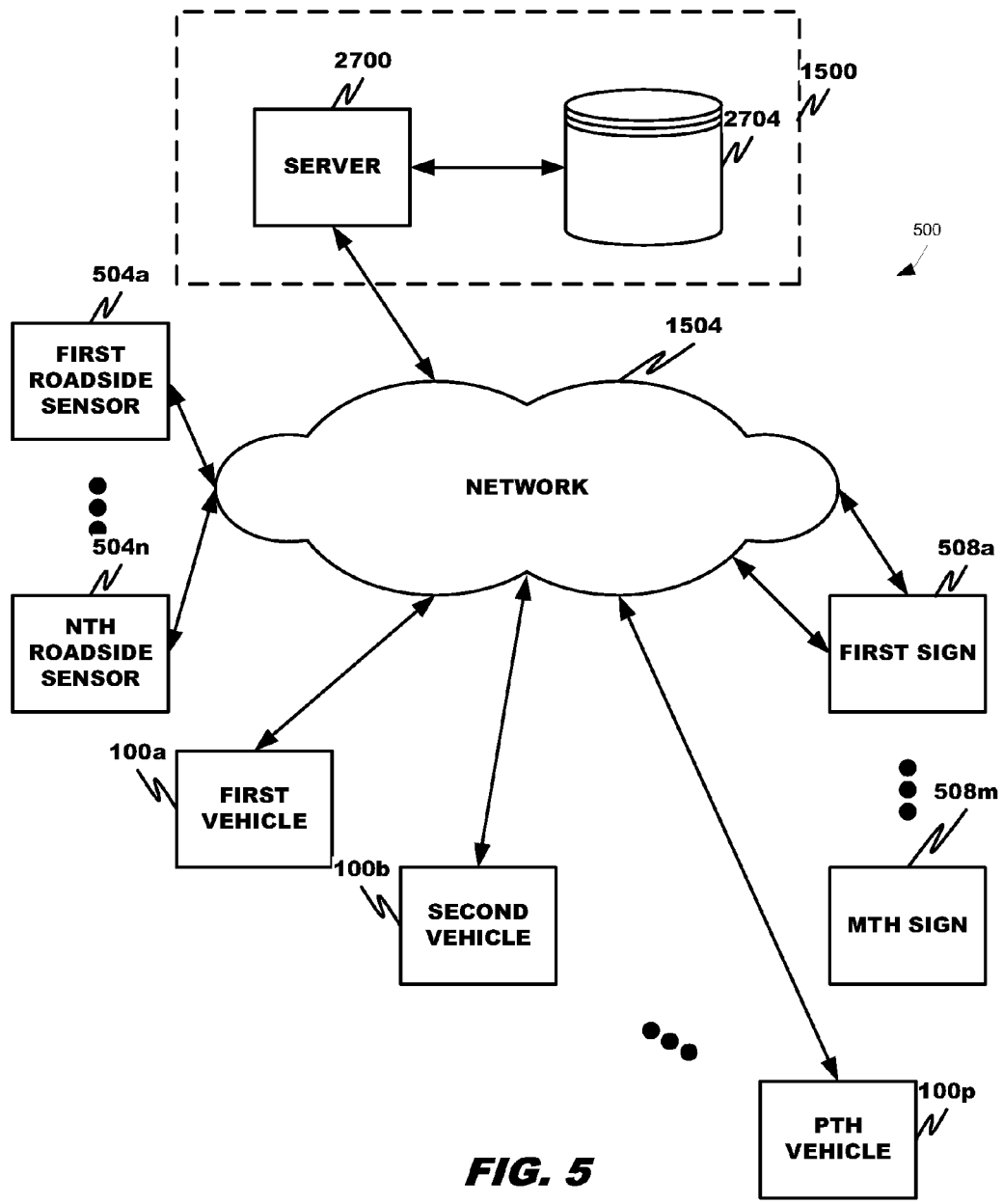
FIG. 5 is a block diagram depicting a communication architecture according to an embodiment.

Referring now to FIG. 5, a further network architecture will now be described. The network architecture includes a service provider 1500 (having a server 2700 and associated database 2704), such as a service providing route information (e.g., automotive navigation, traffic, accident, roadside service (e.g., service station, fuel station, hotel, motel, and/or restaurant information and other road database information), points of interest, and/or weather and road condition information), first, second, . . . nth roadside sensor(s) 504a-n providing roadside information to and/or receiving vehicle information from the vehicle, first sign, second sign, . . . mth sign 508a-m, providing advertising information to and/or receiving occupant preference information from the vehicle, and first, second, . . . pth vehicle 100a-b, all in wireless communication with one another, via network 1504.

Road database information or route information provided by the service provider 1500 can be a vector map of some area of interest. Street names or numbers and house numbers are encoded as geographic coordinates so that the user can find some desired destination by street address (see map database management). Points of interest (waypoints) will also be stored with their geographic coordinates. Point of interest specialties include speed cameras, service stations, fuel stations, lodging facilities, restaurants, traffic levels along possible routes, public parking, and "parked here" (or "you parked here"). Contents can be produced by the user base as their cars drive along existing streets (Wi-Fi) and communicating via the internet, yielding a free and up-to-date map. The map format can be any suitable format including CARiN database format (CDF), SDAL, and physical storage format (PSF).

Roadside monitors can sense or monitor a number of different parameters for use by the map updating module, including emission levels, traffic levels, traffic speed, and weather or road conditions. An exemplary roadside monitor is provided by intelligent Speed Adaptation (ISA), also known as Intelligent Speed Assistance and Speed Alerting, is any system that constantly monitors vehicle speed and the local speed limit on a road and implements an action when the vehicle is detected to be exceeding the speed limit. This can be done through an advisory system, where the driver is warned, or through an intervention system where the driving systems of the vehicle are controlled automatically to reduce the vehicle's speed.

Advertising information, provided by roadside signs or other beacons, can include, for example, vendor or service provider name, contact information, and map location (which can automatically be input by the reporting module into an automotive navigation system application in a memory of the vehicle), product or service information (including cost), and the like. The vehicle 100 may provide information to intelligent signs or beacons regarding the operator's or an occupant's current and/or historic preferences, needs or requirements to discourage or encourage provision of advertising information to the vehicle. Alternatively, the processing module 124 can use the preferences, needs or requirements to filter out advertising information not of interest to the operator or occupant, thereby presenting to the operator and/or occupant only advertising information of interest. The reporting module can, in response to occupant input, initiate automatically a contact between the occupant and the service provider or vendor. Alternatively, the session can be initiated automatically by the roadside sign or beacon.

The network can be any wireless network including those discussed above.

As noted, each of the first, second, . . . nth roadside sensors 504a-n, first, second, . . . mth signs 508a-m, and first, second, . . . pth vehicles 100a-p can have an associated Internet address, such as defined by IP version 6, and are therefore addressable by one another. The address of one node can be discovered by another node using any suitable discovery protocol. The various nodes thereby can form a vehicular ad-hoc network or a mobile ad-hoc network. Routing within the ad-hoc network can be effected by any suitable protocol, including table-driven (pro-active) routing protocols, reactive (on-demand) routing protocols, flow-oriented routing protocols, hybrid routing protocols, hierarchical routing protocols, backpressure routing protocols, host specific routing protocols, power-aware routing protocols, multicast routing protocols, geographical multicast protocols, on-demand data delivery routing protocols, and the like.

A number of examples will now be discussed to illustrate the various modules.

Figure 12:
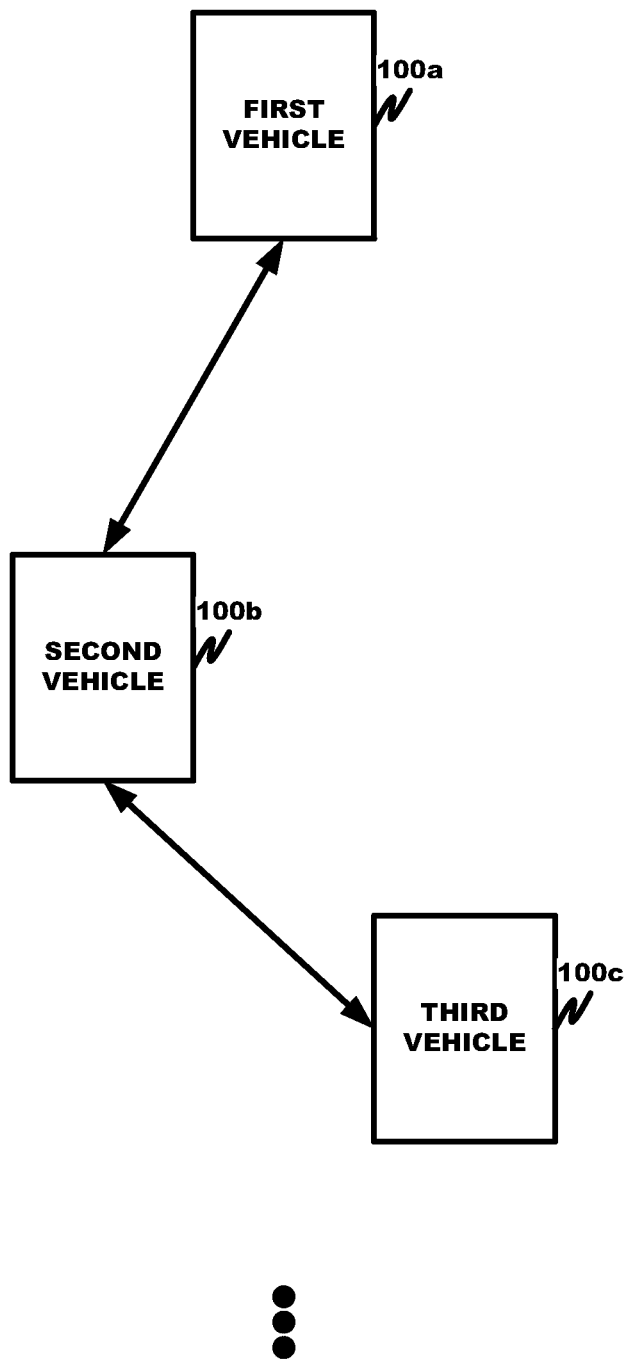
FIG. 12 is a block diagram depicting daisy-chain communications.

FIG. 12 depicts a vehicular ad-hoc network. First and third vehicles 100a and c are out of wireless communication range of one another and are therefore unable to communicate. Each of the first and third vehicles 100a and c, however, are in wireless communication range of, and therefore able to communicate with, second vehicle 100b. The first vehicle 100a can therefore wireless transmit information, such as route information, to the second vehicle 100b, and the second vehicle 100b, in a type of daisy-chain, can transmit the information received from the first vehicle 100a to the third vehicle 100c. This process can be repeated from car-to-car not only to enable each car in the communication chain to update internally or locally stored information but also to add its respective collected information to the received information and forward the combined information to a next vehicle in the chain.

By way of illustration, daisy chaining can be used as a means to provide a proximity warning to determine and alert the presence of adjacent vehicles, road conditions. In particular, the present disclosure allows a vehicle to communicate with vehicles in a determined proximity of the vehicle. Specifically, a vehicle may provide route information to adjacent vehicles and can "daisy-chain" back to a given user to transmit general traffic information back up the chain. In one embodiment, each vehicle is a node in a network of vehicles. This network of vehicles may be self-configurable and self-healing. In other words, there is no central point of intelligence required because the nodes are distributed among different vehicles. It is anticipated that each vehicle only needs to know the information from surrounding and/or adjacent vehicles. Other types of route information (e.g., automotive navigation, traffic, accident, roadside service (e.g., service station, fuel station, hotel, motel, and/or restaurant information and other road database information), points of interest, and/or weather and road condition information), can also be daisy chained.

Figure 13:
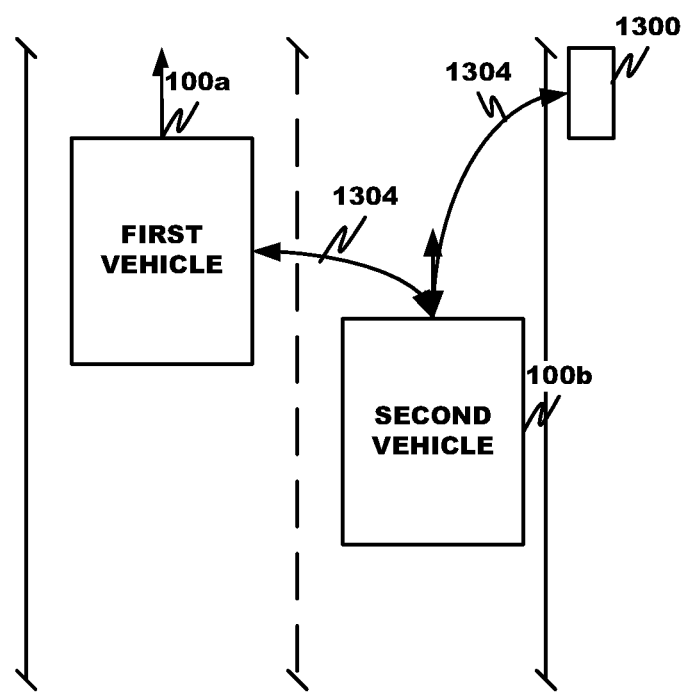
FIG. 13 is a block diagram depicting an embodiment.

FIG. 13 depicts object sensing enabled by the exchange of information between vehicles. The present disclosure describes a communication between first and second vehicles 100a and b and a roadside object 1300, such as a pedestrian, cyclist, sign, beacon, and the like to determine presence, proximity or relative spatial locations, trajectory, heading, or bearing, and/or likelihood of collision. These communication 1304 may be based on information beyond vehicle proximity sensing. For example, a phone may use its location-based information and/or associated sensors to determine position (e.g., SPS location coordinates) and at least one travel vector. The phone may send a ping message asking if there is anyone adjacent to (or within a certain spatial distance of) the transmitting vehicle. In response, nearby phones, devices, and/or vehicles may respond with a presence indication and/or spatial location (e.g., SPS location coordinates). It is anticipated that the vehicle or roadside object 1300 could also send this ping message. In some embodiments, the presence indication may include, but is not limited to, information such as a device's location, travel vector, distance to response device, and device type.

As can be appreciated, data relating to the presence of a vehicle may be obtained from a number of different systems in a number of different ways. For example, the system may use timed radio waves, poll various SPS units and information and perform calculations, of speed, location, direction, collision/safe stop, airbag status, to relay valuable information throughout the daisy-chain. As a further example, if at least one vehicle is traveling in the wrong direction, against the usual flow of traffic, other vehicles may be alerted by receiving information from the at least one vehicle travelling in the wrong direction. In addition, information gleaned from the response and actions of other vehicles may be relayed to each vehicle. Therefore, if other vehicles are slowing, pulling-over, and even stopping, adjacent vehicles are alerted of these actions.

FIG. 18 illustrates a sensing method where elements and usage may be controlled based on environmental factors in accordance with embodiments of the present disclosure. Specifically, an aspect of the present disclosure is directed to the control of vehicle sensors, roadside sensors and monitors, beacons, and signs to conserve energy usage and data transfer based on multiple factors. In one embodiment, it is anticipated that certain sensors, monitors, beacons, and signs do not need to continually operate at times of the day and/or days where traffic is minimal. For example, the system may observe that traffic is extremely light in a given area, and/or because the car is in motion at a time of the day (e.g., 2:00 am) certain sensors, monitors, beacons, and signs may be controlled to sense, or sample, less frequently. It is further anticipated that certain sensors, monitors, beacons, and signs may be deactivated completely depending on the conditions. Factors contributing to this intelligent energy-saving feature may be based on sensed vehicle access, time of day, traffic info from a Automotive navigation system, reported conditions from other users, and the like.

Figure 14:
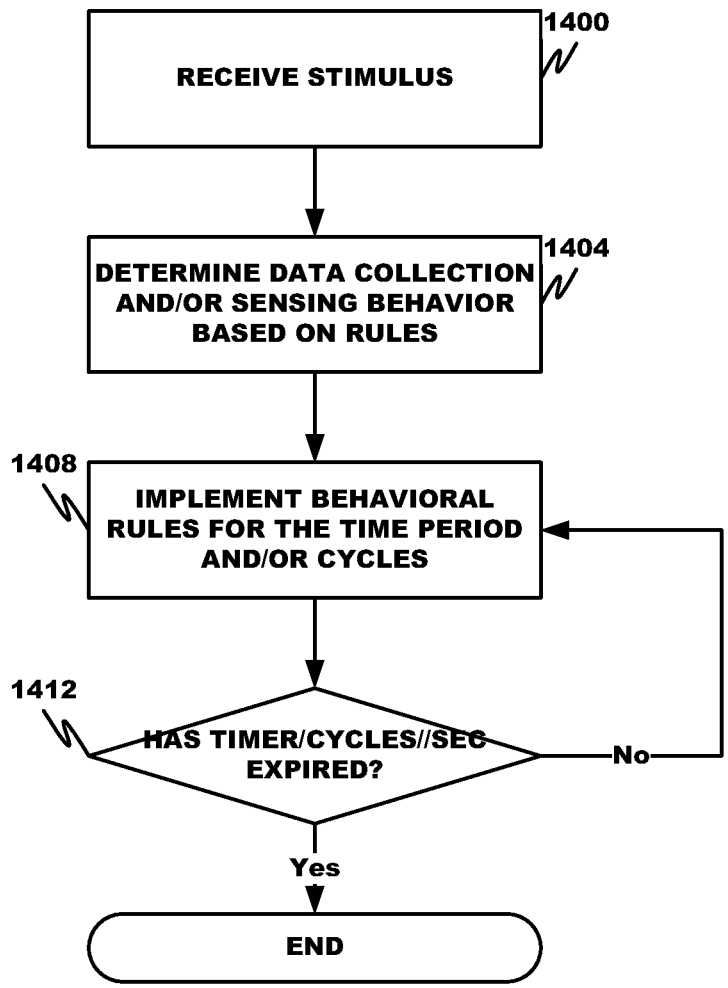
FIG. 14 depicts a flow diagram according to an embodiment.

Referring to FIG. 14, a microprocessor receives a stimulus (step 1400), such as passage of time, passage of a vehicle, query from a sensor, monitor, beacon, and/or sign, and the like. The microprocessor, in response, determines data collection and/or sensing behavior based on a selected rule set (step 1404). The rule set may be default and/or varied, updated, or modified based on observed behavior patterns of traffic or other random or pseudorandom events. The microprocessor next implements the behavioral rules for a selected time period and/or number of cycles. When the timer, cycles, or time period has expired, the microprocessor terminates operation. When the timer, cycles, or time period has not expired, the microprocessor returns to step 1408.

Collected route information may be applied by the map updating module 1524 to map updates. Specifically, sensors, monitors, beacons, and/or signs may be directed to relay specific information during nonpeak times. This information may include map comparisons relating to road position, lane number, and size. It is anticipated that all of this data may be compiled with a combination of vehicle and/or roadside sensors, monitors, beacons, and/or signs. Additionally, sensors, monitors, beacons, and/or signs on lane dividers, signs, and other markings may communicate with a vehicle to provide more information relating to map, and other, data.

The processing module can be used to determine an accurate location of a vehicle in accordance with embodiments of the present disclosure. Currently, a smart phone may be used to record information relating to a parked vehicle. However, this information is typically input by a user and resides with a phone. It has not been disclosed heretofore that a vehicle provides information relating to its specific position using data in addition to that provided a SPS unit.

The processing module can use multiple sensors to determine the current location of the corresponding vehicle and relay that position to a smart phone and/or other device. Specifically, in addition to providing SPS or other location information (via cell towers, and/or WiFi access points, etc.) the vehicle may use temperature sensors, altitude sensors, barometric pressure sensors and the like to determine whether the vehicle is located in or near an underground structure, under a tree, or other landmark. An exemplary use of such a system may have application when parking a car at an airport or shopping area. If the vehicle is parked underground in the summer, the surrounding temperature may be cooler than ambient temperatures. This comparison may be made by comparing data obtained from vehicle sensors with data obtained regarding the local ambient temperature.

FIG. 5 can depict a real-time traffic system 1500. Currently, vehicle operators, can receive general traffic information from a service like XM or Sirius radio. This service provides traffic information received and relayed from static monitors to an XM or Sirius device installed in an automobile.

The system 1500 includes a central database (such as XM or Sirius traffic) 2704 and associated server 2700 with traffic information obtained from vehicles and associated devices. This information may then be relayed to vehicles in real-time. Data obtained from the operation of a vehicle may be used in determining traffic conditions (signal breaking, speed, etc.). Specifically, the daisy-chain network and sensors previously described can provide information to be used in interpreting the real-time traffic conditions. For example, several vehicles slowing to a stop could indicate an accident or emergency that could be relayed to the public. The real-time traffic system would then correlate the information and provide the collected and correlated traffic information to the public, such as by a broadcast or push or pull signaling mechanism.

Additionally, the availability of this data may be limited to dissemination to a select few. For example, those who contribute data relating to traffic may be those who can receive information relating to overall traffic conditions. Otherwise, the signal may be blocked to others, those who do not activate feature, and/or participate in the information collection, etc.

FIG. 5 can also depict a system where map data is updated from vehicles and associated devices. Currently, map data and directions may be provided to a vehicle by SPS units, map disks, or a Automotive navigation system. However, the data can become old and incorrect as time passes.

The system 1500 where map data is updated based on information provided by other users and vehicles is provided. Specifically, the system may get updates on mapped areas by receiving information provided by a plurality of devices. Additionally, the system may make corrections to map data providing accurate data over time.

The processing module in the automobile may track where you are currently located. If the SPS unit provides specific directions to a vehicle and an individual takes a route that does not follow the directions provided, the area may be flagged for further investigation. The area would be flagged because failure to adhere to provided directions may indicate inaccurate directions and/or changed conditions. The flagged areas may then be compared to other users' behavior and travel patterns. This data may also be collected relating to other settings, including parking lots, store front locations, etc.

Such information can enable map updates or corrections to reflect where people are actually driving. Specifically, a vehicle can track where it is currently located. If a automotive navigation system directs the vehicle operator to "take route on X and turn right" but the directions taken by the operator do not match the directions provided by the automotive navigation system, the particular set of directions can be flagged for further investigation and comparison to other future users' behavior and travel patterns. This data can also be collected relating to other settings, such as parking lots, store front locations, and the like.

Furthermore, the map updating function may suggest alternate routes in addition to or alternatively to standard map routes. These alternate routes may be generated by: 1) the SPS unit, 2) past driver data, 3) compilation of data from other users/drivers, and 4) combinations thereof. These routes may also be coded according to the route suggestion type and source. For example, your current location, or source, is X, and you want to get to destination, Y; different routes are provided using a combination of SPS location and other data coded in alternate colors/numbers/or other identifiers.

The system 1500 can also measure standard travel times for routes and store them against specific days and times. If a vehicle travels to a location (e.g., work) at a specific time every day, it can determine traffic patterns, stoppage at traffic lights and stop signs, and the like. This data can be aggregated with multiple users' devices and vehicles to get and project more realistic arrival times and routes. Standard SPS units and services with "real-time" traffic cannot perform this function well. Using dates in the compilation of traffic data and predicted times is important because a specific date may provide a better prediction of traffic conditions. By cross-referencing a particular date against popular holiday and/or vacation months traffic conditions may be more accurately predicted. Further, the system may use the sensors associated with the vehicle to determine estimated traffic times based on current weather and/or road conditions. Alternatively, the weather conditions may obtained by connecting to a source providing data from weather stations and sensors remote from the vehicle.

The occupant information module 1550 can access and/or maintain occupant information for each vehicle occupant. This information, for example, includes occupant identity, occupant occupation and employer, occupant socioeconomic status, occupant business and residential addresses, occupant interests and disinterests, occupant driving history, occupant current and historic driving behavior and patterns, occupant medical history and/or condition, occupant interpersonal associations with other persons (e.g., contacts), criminal history, and the like. This information can be used for a variety of purposes including filtering advertising information to determine what is of interest to the occupant, warning other vehicles of driving behavior, warning other vehicles of criminal history of the occupant, and the like.

The occupant information module 1550 can exchange information with one or public records databases 2704 via server 2700 for the purposes of general awareness. Currently, sexual predators, felons, parolees, and other offenders must register with a "sexual predator database" or other database to alert the public of their home location. However, there is nothing that continually tracks a sexual predator or offender or alerts others if a sexual predator or offender is nearby in his/her car.

The occupant information module can connect to a sexual predator and/or other database and use contextual or offender behavioral patterns to determine predator whereabouts. Using information relating to a home position of a sexual predator or other offender and comparing that position to a given automobile's repeated park position, the occupant information module may make a connection between a predator or other offender and a given vehicle. In the event that a vehicle is parked near a predator's or other offender's home location, recorded in the sexual predator database, the vehicle may associate itself with belonging to the sexual predator or other offender. Others may then be warned, by the respective processing module of his or her vehicle, of the sexual predator's or other offender's location depending on the location of the associated vehicle.

The occupant information module can use one or more additional checks to verify that the predator's home is truly associated with the appropriate vehicle. For example, if the sexual predator lives in an apartment building with multiple parking spaces, extra data points may be used not to falsely associate cars with sexual predators or other offenders. In this instance, the occupant information module may record whether the automobile has parked near a known sexual predator's or other offender's work location as an extra factor to add to the accuracy of identifying the true sexual predator. Additionally, the occupant information module can make an assumed association and attempt to verify the information, such as by accessing state, local, and/or municipal motor vehicle records in a database 2704 to map an identity of the sexual predator or other offender against the owner of record for the respective vehicle, before making the information public and/or by sending a verification request to a sexual predator or other offender registry and ask if the sexual predator or other offender is actually associated with the vehicle. Although described as relating to sexual predators, it can be appreciated by one skilled in the art that the application may also apply to other known criminals, violent offenders, and other individuals who may be found in public record databases.

The reporting module 1554 can receive advertising information from the Internet, a roadside sign, beacon, transmitter, or transceiver, apply whitelists, blacklists, and/or user preferences or profile information to determine whether the advertising information may be presented to or otherwise is of potential interest to a vehicle occupant, map the current vehicle spatial location (e.g., SPS coordinates) against a legal requirements database to determine applicable federal, state, local or municipal laws regarding vehicle operation, and determine whether and/or how the advertising information may be presented to the occupant (e.g., the operator is a driver and the advertising information cannot be presented visually to the driver). If permitted, the information can then be presented to the occupant in the appropriate manner.

The data collection module 1532 can collect vehicle performance information (e.g., speed, acceleration, deceleration, brake usage, accelerator pedal usage, video feeds, and other information from on board sensors 1516) and vehicle location information to enable estimates of traffic levels or congestion and/or accident locations and provide the collected performance information to a remote node 1500, such as a traffic information provider. For example, several cars slowing to a stop along a common length of roadway can indicate an accident or emergency. An example of such a provider could be a satellite radio station, such as On Star™ or SiriusXM™, or a department of transportation or other federal, state, provincial local, or municipal entity. The remote node 1500 (which includes a server 2700 and central database 2704) could collect performance and vehicle location information from other vehicles and estimate levels of traffic congestion along a selected roadway. The estimated level of traffic congestion (which can be qualitative and/or quantitative (showing average speeds along selected segments of roadways) are provided to reporting modules in the contributing and optionally other vehicles substantially in real time. In one business model, the information is supplied only to those vehicles contributing performance and vehicle location information. In one business model, the information is supplied to subscribing vehicles.

Operation of Network Controller 1528

Figure 6:
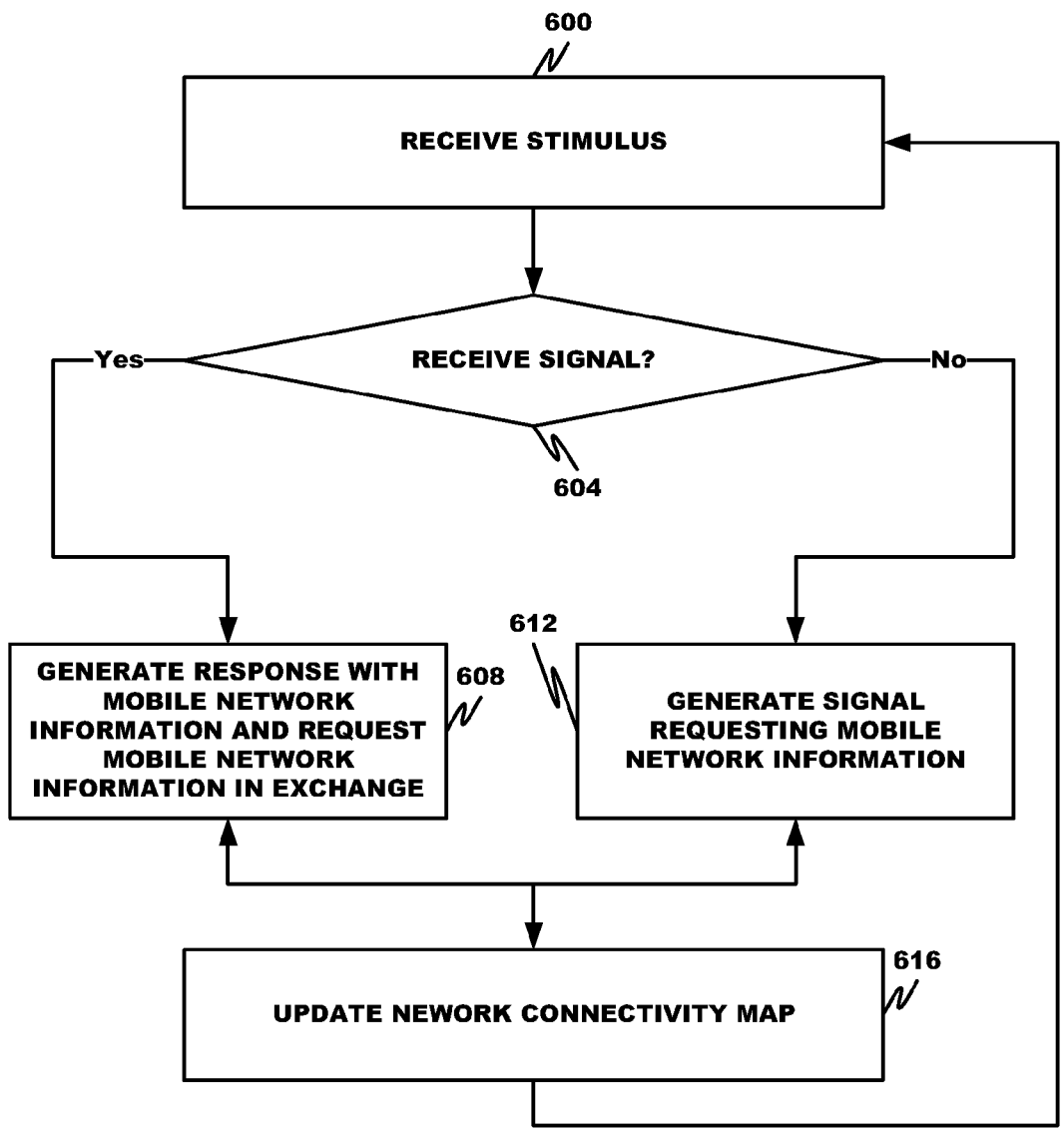
FIG. 6 depicts a flow diagram according to an embodiment.

Referring to FIG. 6, the process of ad-hoc network topology discovery will be discussed.

In step 600, the network controller 1528 receives a stimulus. The stimulus can be, for example, the passage of time, receipt of a network discovery signal or request from another node in the ad-hoc network, a vehicle operator or occupant request, and the like.

In decision diamond 604, the network controller 1528 determines whether the stimulus was receipt of a network discovery signal. If so, the network controller 1528, in step 608, generates a response with mobile network information and, if not previously received, requests mobile network information from the signal source in exchange. Mobile network information includes, for example, electronic address (e.g., Internet protocol address), communication capabilities, communication link parameters (for communications between the signal source and recipient nodes) (e.g., encryption/decryption algorithm, security parameters, window and frame size link layer parameters, data rates, and other transmission parameters. When received, this information is associated with the signal source node in the locally stored network topology at the destination node. When the signal was not a network discovery signal, the network controller 1528 determines whether the signal source has previously been discovered and is known to the locally stored network topology. When it is not present in the locally stored network topology, the network controller, in step 612, generates a network discovery signal or request requesting mobile network information.

Following either steps 608 or 612, the network controller 1528, in step 616, updates the locally stored network connectivity map, or network topology, and returns to step 600.

Figure 7:
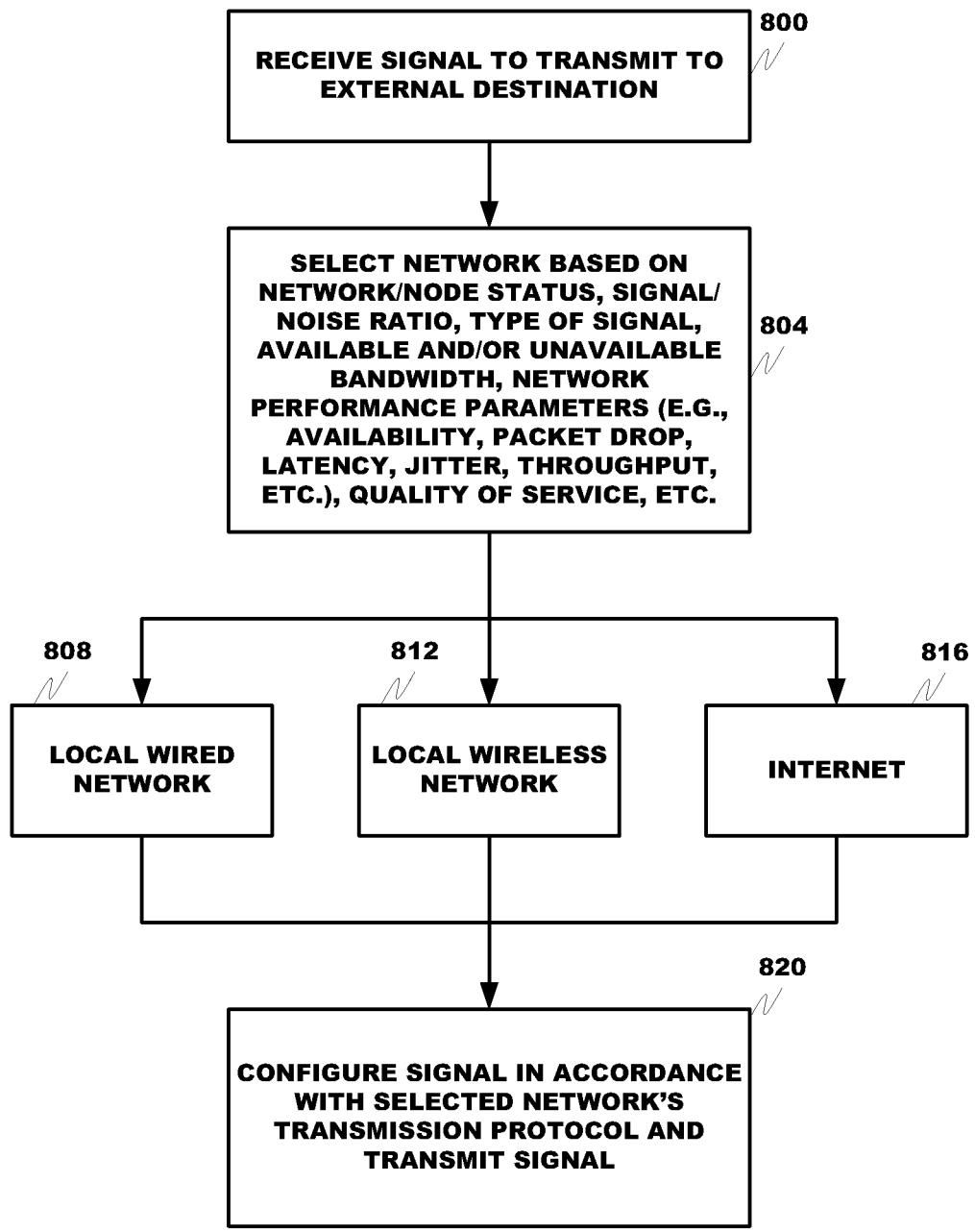
FIG. 7 depicts a flow diagram according to an embodiment.

A further operation of the network controller 1528 is shown in FIG. 7.

Referring to FIG. 7, the network controller 1528, in step 800, receives a signal to transmit to an external destination, such as a roadside sensor, sign, or vehicle.

The network controller 1528, in step 804, selects a network compatible with the type and/or required format of the signal, such as one or more of local wired network 808, local wireless network 812, and/or the internet 816, to deliver the signal to a selected local or remote endpoint. The selection is based on one or more factors, including a type, urgency, importance and/or requirements of the signal (e.g., whether the signal contains an urgent flag or other urgency indicator, a source of the signal (such as from an on-board sensor or sensor monitor, a critical component, a non-critical component, and the like), a type of signal payload (such as whether the signal contains multimedia), transmission and/or bandwidth requirements for the signal (e.g., requisite maximum latency, packet loss, jitter, and/or transmission rate, transport protocol, quality of service, and the like)), an operational status (e.g., operational or nonoperational) of each of the compatible networks, an operational status of an intermediate node on the compatible networks, a signal/noise ratio over each of the compatible networks, available and/or unavailable bandwidth for each of the compatible networks, current compatible network performance parameters (e.g., packet drop, latency, jitter, throughput, quality of service, and the like), and other factors influencing signal quality, reliability, and/or transmission speed.

Generally, the network selector 2036 determines the type, urgency, importance and/or requirements of the signal and one or more of the above parameters for each of the compatible networks, compares the signal parameters with the compatible network parameters and selects the compatible network able to currently best satisfy the requisite signal parameters. For example, a signal from a critical component generally is transmitted by a local wired network 808, such as a bus, due to the high signal quality, reliability and/or transmission speed required for the signal. A multimedia signal would generally not be transmitted by a local wired network as it is not commonly incompatible with the signal payload. Such a signal would more typically be transmitted by a local wireless network 812 (e.g., by Bluetooth™ or WiFi™ or a "hot spot") or, if the signal recipient (whether or not an on board component or remote node) has a corresponding IP address, by the internet 816.

Once the compatible network is selected for signal transmission, the network controller 1528, in step 820, configures or causes to be configured the signal in accordance with the selected network's transmission protocol. For example, when the signal is to be transmitted over a local wireless network 812, the signal payload and/or signal itself would generally be packaged (such as by a protocol stack) in a header and trailer in accordance with an appropriate one of the WiFi™ or Bluetooth™ protocols. By way of further example, when the signal is to be transmitted over the Internet 816, the signal payload and/or signal itself would generally be packaged (such as by a protocol stack) in a header and trailer in accordance with TCP/IP suite of protocols.

The properly configured or formatted signal is then transmitted over the selected compatible network.

Operation of Data Collection Module 1532

Figure 15:
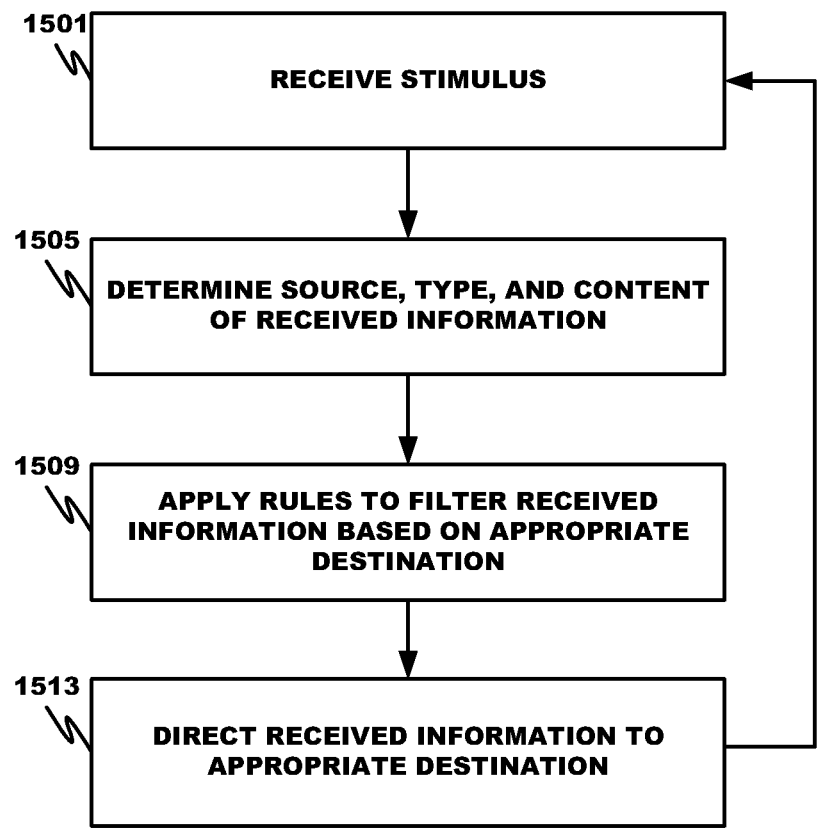
FIG. 15 depicts a flow diagram according to an embodiment.

Referring to FIG. 15, the process of the data collection module 1532 will be discussed.

In step 1501, the data collection module 1532 detects a stimulus, such as receipt of a signal from a vehicle on board component or sensor, a roadside sensor, beacon, or sign, another vehicle, a remote node 1500.

In step 1505, the data collection module 1532 determines, for a received signal, a signal source, a type of signal, and an informational content of the received signal.

In step 1509, the data collection module 1532 applies predetermined rules to filter received information based on the appropriate destination. For example, when the destination is another vehicle or a remote node 1500 personal, sensitive or confidential information to the vehicle operator or occupant is removed before signal retransmission or new signal generation and transmission. Other rules may be employed to remove information irrelevant to the destination for the information.

In step 1513, the data collection module 1532 directs the received information to the appropriate destination.

Operation of Reporting Module 1554

Figure 8:
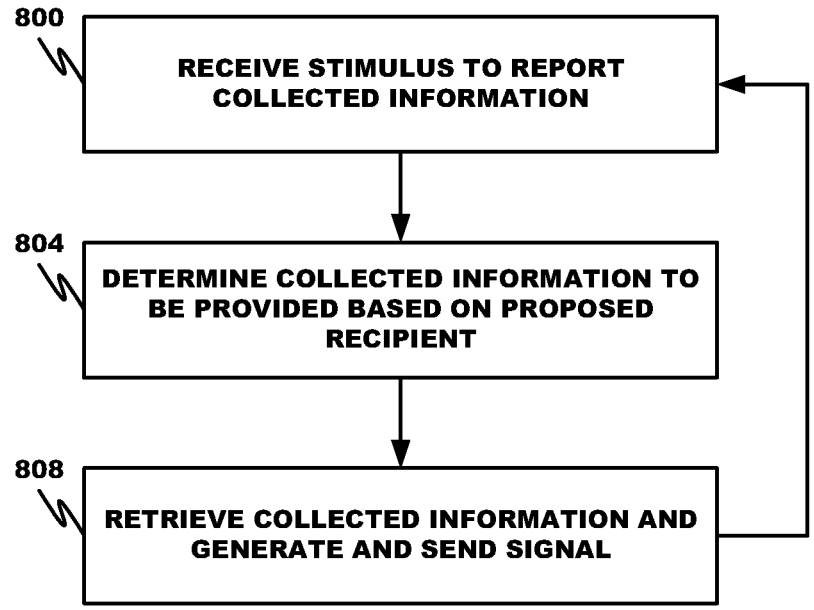
FIG. 8 depicts a flow diagram according to an embodiment.

An operation of the reporting module 1554 will now be discussed with reference to FIG. 8.

The reporting module 1554, in step 800, receives a stimulus to report collected information to a proposed recipient, such as the service provider 1500. The stimulus, for example, can be passage of time, identified navigation map error, user request, deviation from recommended navigation route to a selected deviation, receipt of signal from roadside sensor, sign, or vehicle indicating condition, feature, route, or problem not reflected on navigation map, and the like.

In step 804, the reporting module 1554 determines the collected information to be provided based on the identity or nature of the proposed signal recipient. In effect, this step determines whether and what collected information the proposed signal destination or recipient is authorized and privileged to receive.

In step 808, the reporting module 1554 retrieves the filtered collected information and generates and sends the signal to the recipient.

Operation of Map Updating Module 1524

Figure 9:
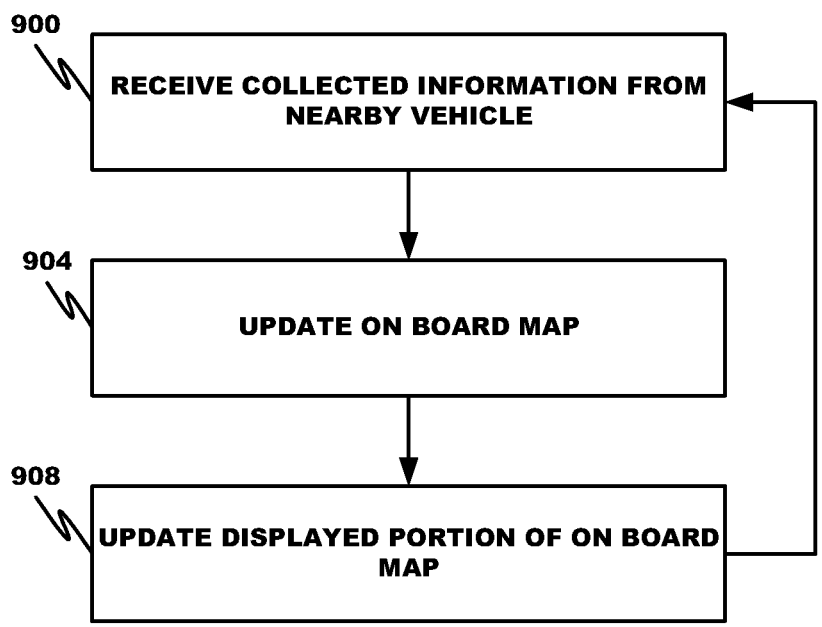
FIG. 9 depicts a flow diagram according to an embodiment.

An operation of the map updating module 1524 will now be discussed with reference to FIG. 9.

The map updating module 1524, in step 900, receives collected information from a nearby vehicle.

In step 904, the map updating module 1524 updates a locally stored navigation map with the received collected information. If requested by the sender or required by a rule, the map updating module 1524 causes the reporting module 1554 to forward the received collected information to one or more other nodes in the locally stored network topology.

In step 908, the map updating module 1524 updates the displayed portion of the map on the touchscreen or other input/output system with the updated locally stored navigation map.

Operation of Occupant Information Module 1550

Figure 10:
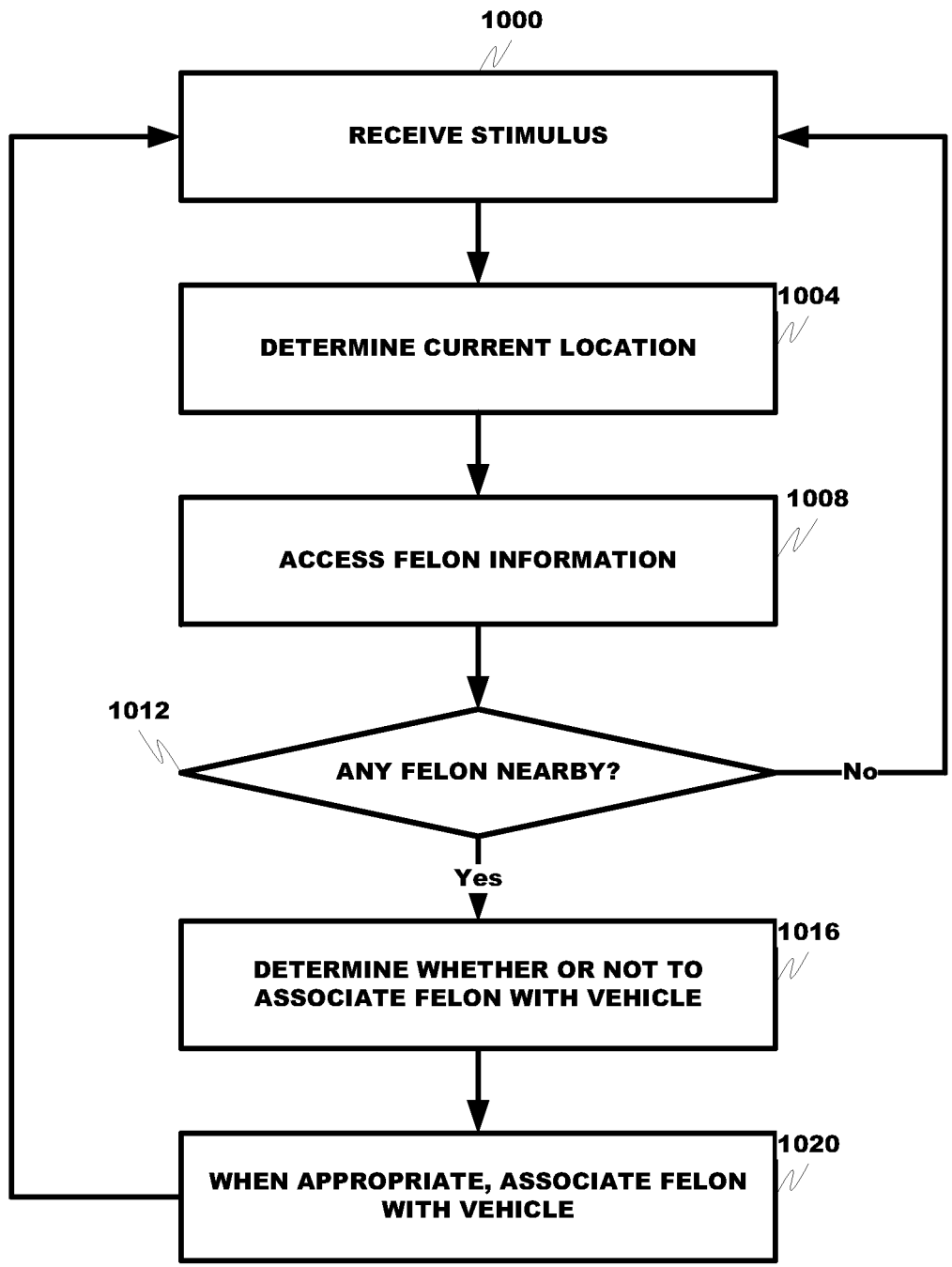
FIG. 10 depicts a flow diagram according to an embodiment.

An operation of the occupant information module 1550 will now be discussed with reference to FIG. 10.

The occupant information module 1550 receives a stimulus in step 1000. The stimulus can be passage of time, query from another vehicle, query from a law enforcement authority for a current vehicle location, and the like.

In step 1004, the occupant information module 1550 determines, by an SPS module, the current location of the vehicle.

In step 1008, the occupant information module 1550 accesses felon or other offender information, which may include static or dynamic information where the felon or other offender has a tracking device, from a law enforcement authority system 1500.

In decision diamond 1012, the occupant information module 1550 determines whether a felon or other offender is nearby the current vehicle location.

When no offender is nearby (e.g., within a specified radius or distance of the current vehicle location), the occupant information module returns to step 1000.

When an offender is nearby, the occupant information module in step 1016 determines whether or not to associate the felon or other offender with the current vehicle. This determination, for example, can include the felon or offender identity, the recorded owner of the vehicle, the historic association or interaction of the offender with the vehicle (e.g., the frequency of contact of the offender with the vehicle, the frequency of the offender being in proximity to the vehicle, and the like), the proximity of the vehicle to a place of residence of the offender, and the like.

When sufficient contacts exist between the offender and the vehicle, the occupant information module, in step 1020, associates the offender with the current vehicle.

Figure 11:
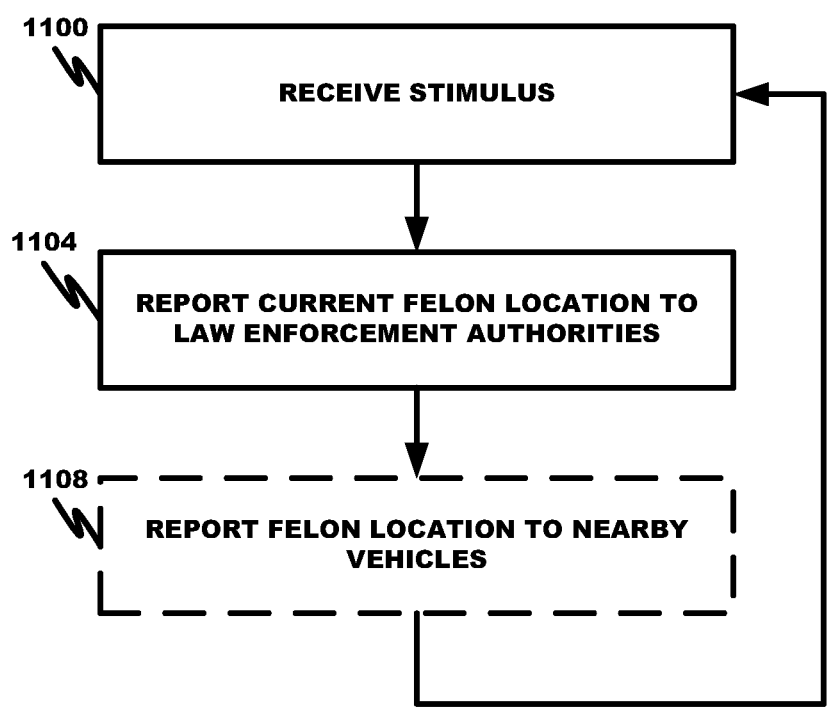
FIG. 11 depicts a flow diagram according to an embodiment.

A further operation of the occupant information module 1550 will now be discussed with reference to FIG. 11.

In step 1100, the occupant information module receives a stimulus. The stimulus can be, for example, passage of time, proximity of the vehicle to a sensitive location for the type of offense committed by the offender (such as proximity of a vehicle owned by a pedophile to a school or school yard or child care facility), and the like.

In step 1104, the occupant information module reports the current offender location to a law enforcement authority, such as via system 1500.

Optionally, in step 1108, the occupant information module reports the offender location to processing modules of one or more nearby vehicles for presentation to respective operators and occupants.

The exemplary systems and methods of this disclosure have been described in relation to vehicle processing modules. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a vehicle computer system, a Personal Computer (PC), laptop, netbook, smart phone, Personal Digital Assistant (PDA), tablet, etc., or collocated on a particular node of a distributed network, such as an analog and/or digital communications network, a packet-switch network, or a circuit-switched network or collocated on a particular node of a distributed network, such as an analog and/or digital communications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a server. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in con junction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A vehicle, comprising:
a processor;
a vehicle memory coupled to the processor and comprising occupant information;
an occupant information module to maintain, in the vehicle memory, the occupant information for at least one vehicle occupant and report the occupant information to a third party, the occupant information comprising one or more of occupant identity, occupant residential address, occupant driving history, occupant current and/or historic driving behavior and/or pattern, and current vehicle location and one or more of occupant occupation, occupant employer, occupant socioeconomic status, occupant business address, occupant interest, occupant disinterest, occupant interpersonal associations with other persons, and criminal history, and wherein the occupant information is used by a third party advertiser to determine what advertising information is of interest to the at least one vehicle occupant in connection with the third party advertiser providing the advertising information of interest to the at least one vehicle occupant while the at least one vehicle occupant is in the vehicle.

2. The vehicle of claim 1, wherein the occupant information comprises at least one of driving history, occupant current and/or historic driving behavior and/or pattern and wherein the third party is an insurance company having an insurance policy on the vehicle.

3. A method, comprising:
maintaining, by a processor executing a processor executable occupant information module and in vehicle memory, occupant information for at least one vehicle occupant for reporting the occupant information to a third party, the occupant information comprising one or more of occupant identity, occupant residential address, occupant driving history, occupant current and/or historic driving behavior and/or pattern, and current vehicle location and one or more of occupant occupation, occupant employer, occupant socioeconomic status, occupant business address, occupant interest, occupant disinterest, occupant interpersonal associations with other persons, and criminal history, and wherein the occupant information is used by a third party advertiser to determine what advertising information is of interest to the at least one vehicle occupant in connection with the third party advertiser providing the advertising information of interest to the at least one vehicle occupant while the at least one vehicle occupant is in the vehicle.

4. The method of claim 3, wherein the occupant information module reports the occupant information to a law enforcement authority and wherein the occupant information comprises occupant identity.

5. The method of claim 4, wherein the occupant information comprises criminal history.

6. The method of claim 3, wherein the occupant information comprises at least one of driving history, occupant current and/or historic driving behavior and/or pattern and wherein the third party is an insurance company having an insurance policy on the vehicle.

7. The method of claim 3, wherein the occupant information module determines, using information received from a law enforcement database, a criminal history of an possible vehicle occupant, wherein the occupant information module compares a current vehicle location to a physical location associated with a listed criminal offender, and wherein, when the physical location is within a selected spatial distance of a current location of the vehicle when parked, a possible association between the criminal offender and the vehicle.

8. The method of claim 5, wherein the occupant information module notifies an occupant of a different vehicle of the criminal history of the vehicle occupant.

9. The method of claim 8, wherein the occupant information module notifies the third party of the possible association when a frequency of the vehicle being spatially proximal to the physical location is at least a selected threshold.

10. A tangible, non-transitory computer readable medium comprising processor executable instructions that, when executed by a processor, maintain, in vehicle memory, occupant information for at least one vehicle occupant for reporting the occupant information to a third party, the occupant information comprising plural of occupant occupation, occupant employer, occupant socioeconomic status, occupant business address, occupant interest, occupant disinterest, occupant interpersonal associations with other persons, and criminal history, and wherein the occupant information is used by a third party advertiser to determine what advertising information is of interest to the at least one vehicle occupant in connection with the third party advertiser providing the advertising information of interest to the at least one vehicle occupant while the at least one vehicle occupant is in the vehicle.

11. The medium of claim 10, wherein the occupant information module reports the occupant information to a law enforcement authority and wherein the occupant information comprises occupant identity.

12. The medium of claim 11, wherein the occupant information comprises criminal history.

13. The medium of claim 10, wherein the occupant information comprises at least one of driving history, occupant current and/or historic driving behavior and/or pattern and wherein the third party is an insurance company having an insurance policy on the vehicle.

14. The medium of claim 10, wherein the instructions determine, using information received from a law enforcement database, a criminal history of an possible vehicle occupant, wherein the instructions compare a current vehicle location to a physical location associated with a listed criminal offender, and wherein, when the physical location is within a selected spatial distance of a current location of the vehicle when parked, a possible association between the criminal offender and the vehicle.

15. The medium of claim 12, wherein the instructions notify an occupant of a different vehicle of the criminal history of the vehicle occupant.

16. The medium of claim 15, wherein the instructions notify the third party of the possible association when a frequency of the vehicle being spatially proximal to the physical location is at least a selected threshold.

17. The vehicle of claim 1, wherein the occupant information is provided to one or more occupants of one or more other vehicle.

18. The method of claim 3, wherein the occupant information is provided to one or more occupants of one or more other vehicles.

19. The method of claim 10, wherein the occupant information is provided to one or more occupants of one or more other vehicles.

20. A vehicle, comprising:
a processor;
a vehicle memmory coupled to the processor and comprising occupant information; and
an occupant information module to maintain, in the vehicle memory, the occupant information for at least one vehicle occupant and report the occupant information to a third party, the occupant information comprising criminal history, wherein the occupant information module reports the occupant information to a law enforcement authority, wherein the occupant information comprises occupant identity, wherein the microprocessor executing the occupant information module determines, using information received from a law enforcement database, a criminal history of an possible vehicle occupant, wherein the processor executing the occupant information module compares a current vehicle location to a physical location associated with a listed criminal offender, and wherein, when the physical location is within a selected spatial distance of a current location of the vehicle when parked, a possible association between the criminal offender and the vehicle.

21. The vehicle of claim 20, wherein the occupant information module notifies an occupant of a different vehicle of the criminal history of the vehicle occupant.

22. The vehicle of claim 21, wherein the occupant information module notifies the third party of the possible association when a frequency of the vehicle being spatially proximal to the physical location is at least a selected threshold.

23. A method, comprising:

maintaining, by a processor executing a processor executable occupant information module and in vehicle memory, occupant information for at least one vehicle occupant for reporting the occupant information to a third party, the occupant information comprising one or more of occupant identity, occupant residential address, occupant driving history, occupant current and/or historic driving behavior and/or pattern, and current vehicle location and one or more of occupant occupation, occupant employer, occupant socioeconomic status, occupant business address, occupant interest, occupant disinterest, occupant interpersonal associations with other persons, and criminal history, wherein the occupant information is provided to one or more occupants of one or more other vehicles, wherein the processor executing the occupant information module determines, using information received from a law enforcement database, a criminal history of an possible vehicle occupant, wherein the occupant information module compares a current vehicle location to a physical location associated with a listed criminal offender, and wherein, when the physical location is within a selected spatial distance of a current location of the vehicle when parked, a possible association between the criminal offender and the vehicle.

24. A method, comprising:

maintaining, by a processor executing a processor executable occupant information module and in vehicle memory, occupant information for at least one vehicle occupant for reporting the occupant information to a third party, the occupant information comprising one or more of occupant identity, occupant residential address, occupant driving history, occupant current and/or historic driving behavior and/or pattern, and current vehicle location and one or more of occupant occupation, occupant employer, occupant socioeconomic status, occupant business address, occupant interest, occupant disinterest, occupant interpersonal associations with other persons, and criminal history, wherein the occupant information is provided to one or more occupants of one or more other vehicles, wherein the processor executing the occupant information module reports the occupant information to a law enforcement authority, wherein the occupant information comprises occupant identity, wherein the occupant information comprises criminal history, wherein the occupant information module notifies an occupant of a different vehicle of the criminal history of the vehicle occupant, and wherein the processor executing the occupant information module notifies the third party of the possible association when a frequency of the vehicle being spatially proximal to the physical location is at least a selected threshold.

25. A tangible, non-transitory computer readable medium comprising processor executable instructions that, when executed by a processor, maintain, in vehicle memory, occupant information for at least one vehicle occupant for reporting the occupant information to a third party, the occupant information comprising plural of occupant occupation, occupant employer, occupant socioeconomic status, occupant business address, occupant interest, occupant disinterest, occupant interpersonal associations with other persons, and criminal history, wherein the occupant information is provided to one or more occupants of one or more other vehicles, wherein the instructions determine, using information received from a law enforcement database, a criminal history of an possible vehicle occupant, wherein the instructions compare a current vehicle location to a physical location associated with a listed criminal offender, and wherein, when the physical location is within a selected spatial distance of a current location of the vehicle when parked, a possible association between the criminal offender and the vehicle.

26. A tangible, non-transitory computer readable medium comprising processor executable instructions that, when executed by a processor, maintain, in vehicle memory, occupant information for at least one vehicle occupant for reporting the occupant information to a third party, the occupant information comprising plural of occupant occupation, occupant employer, occupant socioeconomic status, occupant business address, occupant interest, occupant disinterest, occupant interpersonal associations with other persons, and criminal history, wherein the occupant information is provided to one or more occupants of one or more other vehicles, wherein the occupant information module reports the occupant information to a law enforcement authority, wherein the occupant information comprises occupant identity, wherein the occupant information comprises criminal history, wherein the instructions notify an occupant of a different vehicle of the criminal history of the vehicle occupant, and wherein the instructions notify the third party of the possible association when a frequency of the vehicle being spatially proximal to the physical location is at least a selected threshold.

* * * * *

UNITED STATES PATENT AND TRADEMARK OFFICE
CERTIFICATE OF CORRECTION

| | | |
|---|---|---|
| PATENT NO. | : 9,240,018 B2 | Page 1 of 1 |
| APPLICATION NO. | : 13/679443 | |
| DATED | : January 19, 2016 | |
| INVENTOR(S) | : Christopher Ricci | |

It is certified that error appears in the above-identified patent and that said Letters Patent is hereby corrected as shown below:

In The Claims
Claim 17, column 28, line 30, delete "vehicle" and insert --vehicles-- therein.
Claim 19, column 28, line 34, delete "method" and insert --medium-- therein.
Claim 20, column 28, line 39, delete "memmory" and insert --memory-- therein.

Signed and Sealed this
Tenth Day of May, 2016

Michelle K. Lee
*Director of the United States Patent and Trademark Office*